(12) United States Patent
Schneider et al.

(10) Patent No.: US 10,115,997 B2
(45) Date of Patent: Oct. 30, 2018

(54) PRISMATIC ELECTROCHEMICAL CELL

(71) Applicants: Bosch Battery Systems LLC, Orion, MI (US); Robert Bosch GmbH, Stuttgart (DE)

(72) Inventors: Dan Schneider, Orion, MI (US); Jeffrey Buckholz, Rochester Hills, MI (US); Liguo E, Rochester Hills, MI (US)

(73) Assignees: BOSCH BATTERY SYSTEMS LLC, Orion, MI (US); ROBERT BOSCH GMBH, Stuttgart (DE)

( * ) Notice: Subject to any disclaimer, the term of this patent is extended or adjusted under 35 U.S.C. 154(b) by 211 days.

(21) Appl. No.: 15/153,340

(22) Filed: May 12, 2016

(65) Prior Publication Data

US 2017/0331141 A1   Nov. 16, 2017

(51) Int. Cl.
*H01M 10/04* (2006.01)

(52) U.S. Cl.
CPC ....... *H01M 10/049* (2013.01); *H01M 10/045* (2013.01)

(58) Field of Classification Search
CPC combination set(s) only.
See application file for complete search history.

(56) References Cited

U.S. PATENT DOCUMENTS

| | | | |
|---|---|---|---|
| 5,521,021 A | 5/1996 | Alexandres et al. | |
| 6,328,769 B1* | 12/2001 | Oweis | H01M 2/263 29/623.1 |
| 6,627,347 B2 | 9/2003 | Fukuda et al. | |
| 6,818,025 B1 | 11/2004 | Ura | |
| 8,679,677 B1 | 3/2014 | Tamaki et al. | |
| 2002/0045096 A1 | 4/2002 | Sandberg et al. | |
| 2003/0003355 A1 | 1/2003 | Ueda et al. | |
| 2003/0003356 A1 | 1/2003 | Tsukamoto et al. | |
| 2004/0102096 A1 | 5/2004 | Lim | |
| 2005/0118501 A1* | 6/2005 | Hashimoto | H01M 2/0232 429/180 |
| 2005/0287435 A1* | 12/2005 | Kim | H01M 2/263 429/174 |
| 2006/0099504 A1 | 5/2006 | Kim | |

(Continued)

FOREIGN PATENT DOCUMENTS

| | | |
|---|---|---|
| CN | 203415648 u | 1/2014 |
| EP | 0655793 | 5/1995 |

(Continued)

OTHER PUBLICATIONS

PCT International Search Report for PCT/EP2017/060811 dated Jul. 5, 2017.

*Primary Examiner* — Kaity V Chandler
(74) *Attorney, Agent, or Firm* — Kelly McGlashen; Maginot Moore & Beck LLP

(57) ABSTRACT

A method of manufacturing an electrochemical cell is provided. The cell includes a rigid housing and an electrode assembly disposed in the housing. The method includes providing a housing that includes a first end, a second end formed separately from the first end, and a tubular sidewall formed separately from each of the first end and the second end. After the electrode assembly is inserted into the sidewall, the first end is welded to one end of the sidewall, and the second end is welded to the other end of the sidewall.

19 Claims, 17 Drawing Sheets

(56) References Cited

U.S. PATENT DOCUMENTS

| | | | |
|---|---|---|---|
| 2006/0108335 A1 | 5/2006 | Zhao et al. | |
| 2007/0111089 A1* | 5/2007 | Swan | H01M 2/024 |
| | | | 429/160 |
| 2007/0289063 A1* | 12/2007 | Martin | A61G 5/10 |
| | | | 5/618 |
| 2008/0138698 A1 | 6/2008 | Ogami et al. | |
| 2010/0273036 A1 | 10/2010 | Marple et al. | |
| 2011/0045340 A1 | 2/2011 | Kwak | |
| 2011/0104541 A1 | 5/2011 | Ahn et al. | |
| 2011/0117423 A1 | 5/2011 | Kim | |
| 2011/0129727 A1 | 6/2011 | Ahn et al. | |
| 2011/0250488 A1 | 10/2011 | Park | |
| 2011/0256433 A1* | 10/2011 | Fuhr | H01M 2/1229 |
| | | | 429/82 |
| 2011/0318613 A1 | 12/2011 | Hohenthanner et al. | |
| 2012/0107668 A1 | 5/2012 | Ling et al. | |
| 2012/0308874 A1* | 12/2012 | Ootani | H01M 10/052 |
| | | | 429/159 |
| 2013/0143097 A1 | 6/2013 | Huang et al. | |
| 2013/0183559 A1* | 7/2013 | Dhar | H01M 2/26 |
| | | | 429/94 |
| 2014/0322576 A1* | 10/2014 | Okumura | H01M 4/505 |
| | | | 429/94 |
| 2015/0236329 A1 | 8/2015 | Okuda et al. | |
| 2015/0263388 A1* | 9/2015 | Raub | H01M 10/399 |
| | | | 429/103 |
| 2015/0280274 A1 | 10/2015 | Deponte et al. | |
| 2016/0072163 A1* | 3/2016 | Tsuruta | H01M 10/658 |
| | | | 429/156 |
| 2016/0141591 A1* | 5/2016 | Lee | H01M 2/0217 |
| | | | 429/179 |
| 2016/0172655 A1* | 6/2016 | Rigobert | H01M 2/30 |
| | | | 429/211 |
| 2016/0226056 A1* | 8/2016 | Masson | H01M 2/022 |

FOREIGN PATENT DOCUMENTS

| | | |
|---|---|---|
| EP | 0955682 | 11/1999 |
| EP | 2528132 | 11/2012 |
| WO | 2013122448 | 8/2013 |

* cited by examiner ic CELL

BACKGROUND

1. Field of the Invention

The disclosure relates to an electrochemical cell that includes a stacked arrangement of electrode plates, and more particularly to the orientation of the electrode plate and electrical connections of the electrode plates relative to the cell housing. A method of manufacturing an electrochemical cell is also described.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs can be formed of a plurality of battery modules, where each battery module includes several electrochemical cells. Within the battery modules, the cells are arranged in two or three dimensional arrays and are electrically connected in series and/or in parallel. Likewise, the battery modules within a battery pack are electrically connected in series and/or in parallel.

Different cell types have emerged in order to deal with the space requirements of a very wide variety of installation situations, and the most common types used in automobiles are cylindrical cells, prismatic cells, and pouch cells. Regardless of cell type, each cell may include a cell housing and an electrode assembly disposed in the cell housing. The electrode assembly includes an alternating series of stacked or rolled positive electrode plates and negative electrode plates that are separated by an intermediate separator material. Each cell may also include a first current collector that is electrically connected to the positive electrode plates and joins the positive electrode plates to a positive cell terminal disposed outside the cell housing, and a second current collector that is electrically connected to the negative electrode plates and joins the negative electrode plates to a negative cell terminal disposed outside the cell housing. Due to the large number of cells used to provide the required power output, vehicle battery packs tend to be large and thus the volume efficiency of the components of a battery system including the cell becomes important. A need exists for improved usage of the internal volume of a cell.

SUMMARY

In some aspects, a method of manufacturing an electrochemical cell is provided. The cell includes a rigid cell housing having the shape of a rectangular prism and an electrode assembly disposed in the cell housing. The method includes the following steps: Providing a cell housing first end; providing a cell housing second end; providing a cell housing sidewall in the form of a tube having a rectangular cross-sectional shape, the cell housing sidewall formed separately from each of the cell housing first end and the cell housing second end; inserting the electrode assembly into the cell housing sidewall; welding the cell housing first end to one end of the cell housing sidewall and welding the cell housing second end to an end of the cell housing sidewall opposed to the one end of the cell housing sidewall.

The method may include one or more of the following method steps and/or features: The electrode assembly includes positive electrode plates alternating with negative electrode plates and separated by at least one separator to form an electrode stack. The electrode assembly defines a stack axis that extends parallel to a stacking direction of the positive electrode plates, the negative electrode plates and the at least one separator. The cell housing sidewall includes a pair of major sides joined by a pair of minor sides, where each side of the pair of major sides is larger in area than each side of the pair of minor sides. In addition, the step of inserting the electrode assembly into the cell housing sidewall includes orienting the electrode stack within the cell housing such that the stack axis extends in a direction that is normal to, and passes through, each side of the pair of minor sides. The electrochemical cell comprises a connector disposed in the cell housing between the electrode assembly and the cell housing first end, and the method includes electrically connecting one end of the connector to a terminal that protrudes through the cell housing first end; electrically connecting another end of the connector to an electrode plate of the electrode assembly; folding the connector such that the one end of the connector overlies the another end of the connector, and such that the cell housing first end abuts the one end of the cell housing sidewalk. The method steps that include electrically connecting one end of the connector to a terminal that protrudes through the cell housing first end; electrically connecting another end of the connector to an electrode plate of the electrode assembly; and folding the connector such that the one end of the connector overlies the another end of the connector, and such that the cell housing first end abuts the one end of the cell housing sidewall, are performed before the method step of welding the cell housing first end to one end of the cell housing sidewall.

The method may also include one or more of the following method steps and/or features: The electrode assembly includes positive electrode plates alternating with negative electrode plates and separated by at least one separator. Each of the positive electrode plates include an electrically conductive first substrate; a first coating disposed on the first substrate, where the first coating is formed of a first active material; a first clear lane that is disposed along an edge of the positive electrode plate, the first clear lane being free of the first coating; and a first opening disposed within the first clear lane. Each of the negative electrode plates include an electrically conductive second substrate; a second coating disposed on the second substrate, where the second coating is formed of a second active material; a second clear lane that is disposed along an edge of the negative electrode plate, the second clear lane being free of the second coating; and a second opening disposed within the second clear lane. In addition, the method includes the following method steps: inserting an electrically conductive first inner plate through each first opening such that the first inner plate extends in a direction perpendicular to each positive electrode plate, and is electrically connected to at least one of the positive electrode plates, and inserting an electrically conductive second inner plate through each second opening such that the second inner plate extends in a direction perpendicular to each negative electrode plate, and is electrically connected to at least one of the negative electrode plates. The method includes folding each positive electrode plate along a first fold line that extends along a margin of the opening, whereby the first clear lane overlies a side of the electrode stack and the first inner plate; and folding each negative electrode along a second fold line that extends along a margin of the opening, whereby the second clear lane overlies a side of the electrode stack and the second inner plate. The method includes disposing an electrically conductive first outer plate over folded first clear lanes such that the first outer plate overlies the first inner plate and the first clear lanes are disposed between the first outer plate and the first inner plate, and disposing an electrically conductive second outer plate over folded second clear lanes such that the second outer plate overlies the second inner plate and the second clear lanes are disposed between the second outer plate and the second inner plate. The method includes welding the first inner plate, the folded first clear lanes, and the first outer plate together to form an electrical connection between the first inner plate, the folded first clear lanes, and the first outer plate, and welding the second inner plate, the folded second clear lanes, and the second outer plate together to form an electrical connection between the second inner plate, the folded second clear lanes, and the second outer plate. The method includes electrically connecting the first outer plate to a terminal that protrudes through the cell housing and is electrically isolated from the cell housing, and electrically connecting the second outer plate to the cell housing.

The method may also include one or more of the following method steps and/or features: A first connector is used to electrically connect the first outer plate to the terminal, and a second connector is used to electrically connect the second outer plate to the cell housing. A connector is used to electrically connect the first outer plate to the terminal, and the second outer plate is electrically connected to the cell housing via direct contact with the cell housing. The electrode assembly comprises positive electrode plates alternating with negative electrode plates and separated by at least one separator, each of the positive electrode plates and the negative electrode plates including an electrically conductive substrate; a coating disposed on the substrate, where the coating is formed of an active material; a clear lane that is disposed along an edge of the substrate, the clear lane being free of the coating; and an opening disposed within the clear lane, and the method includes the following method step: inserting an electrically conductive inner plate through each opening of at least one of the positive electrode plates and the negative electrode plates such that the inner plate extends in a direction perpendicular to each substrate, and is electrically connected to the substrate. The method includes folding each electrode plate of the at least one of the positive electrode plates and the negative electrode plates along a first fold line that extends along a boundary between the coating and the clear lane, whereby the clear lane overlies a side of the electrode stack and the inner plate. The method includes disposing an electrically conductive outer plate over the folded clear lanes such that the outer plate overlies the inner plate and the clear lanes are disposed between the outer plate and the inner plate. The method includes welding the inner plate, the folded clear lanes, and the outer plate together to form an electrical connection between the inner plate, the folded clear lanes, and the outer plate. The method includes electrically connecting the outer plate to one of a cell housing and a terminal that protrudes through the cell housing, where the terminal is electrically isolated from the cell housing. A connector is used to electrically connect the outer plate to the one of a cell housing and a terminal. The first end, the second end and the sidewall are provided as three individual and separate elements, the electrode assembly includes positive electrode plates alternating with negative electrode plates and separated by at least one separator to form an electrode stack, the electrode assembly includes a first current collector including a first connector that electrically connects the positive electrode plates to a positive terminal, and the electrode assembly includes a second current collector including a second connector that electrically connects the negative electrode plates to a negative terminal. The second end and the sidewall are provided as a single integral entity, and the first end is provided as a separate element from the integral sidewall and second end, the electrode assembly includes positive electrode plates alternating with negative electrode plates and separated by at least one separator to form an electrode stack, the electrode assembly includes a first current collector including a first connector that electrically connects one of the negative electrode plates and the positive electrode plates to first terminal, and the electrode assembly includes a second current collector that is connector free and forms a weld-free electrical connection between the other one of the the negative electrode plates and the positive electrode plates and a second terminal.

In some aspects, a prismatic electrochemical cell includes an electrode assembly disposed in a rigid cell housing in such a way as to provide improved efficiency of use of the internal volume of the cell housing by providing an improved electrode arrangement and orientation within the cell housing.

In some aspects, the cell includes a rigid prismatic cell housing including a first end, a second end and a sidewall that connects the first end to the second end. The sidewall is a tube having a rectangular cross sectional shape, and includes a pair of major sides joined by a pair of minor sides, where each side of the pair of major sides is larger in area than each side of the pair of minor sides. The electrode assembly disposed in the housing includes a stacked arrangement of electrode plates. The electrode assembly is oriented within in the cell housing so that the stacking direction of the electrode plates is parallel to an axis that is normal to, and passes through, each side of the pair of minor sides. Use of stacked rectangular electrode plates advantageously permits improved filling of the internal volume of the prismatic cell as compared to use of a jelly-roll electrode configuration within a prismatic cell. In addition, by orienting the electrode plates so as to be perpendicular to the major sides of the cell housing, outward bulging of the major sides of the cell housing due to cell growth is reduced as compared to prismatic cells including a jelly roll electrode assembly, and as compared to prismatic cells including a stacked electrode assembly in which the electrode plates are oriented parallel to the major sides of the cell housing.

In some aspects, the cell includes terminals that provide a large surface as an electrical contact area. The electrical contact area is an outward facing surface that is parallel to the surface of the cell housing from which the terminal protrudes. In some embodiments, the terminal is sized such that the electrical contact area is in a range of 20 to 90 percent of an area of the surface of the cell housing from which the terminal protrudes. In addition, the terminals are low profile in that the dimensions of the electrical contact area are greater than the height of the terminal. By providing a terminal in which the contact surface is parallel to the surface of the cell housing from which the terminal protrudes, and by providing the contact surface as a relatively large area, it is possible to form an electrical connection between adjacent cells of a cell pack or between a cell and the module or pack housing via direct pressure contact, whereby use of bus bars and other types of electrical connectors can be reduced or avoided altogether.

In some aspects, a method of manufacturing an electrochemical cell is provided in which the cell housing is formed of separate elements that are welded together. In some embodiments, the cell housing includes a first end, a second end, and a tubular sidewall that are each formed separately. After insertion of the electrode assembly into the cell housing, the first end and the second end are attached to the respective ends of the sidewall using a welding process. This can be compared to some conventional cylindrical cell housings in which the tubular sidewall and second end are formed integrally for example in a pressing process, and the first end is attached to the sidewall via a crimping process. Use of welding to connect the ends to the sidewall in a prismatic cell is advantageous since it is difficult to provide a reliable crimp at the corner portions of the prismatic housing.

During manufacture of the cell, the electrode assembly is placed within the sidewall, and the negative electrode plates are electrically connected to one end (for example the cell housing first end) prior to the one end being joined to the sidewall. In addition, the positive electrode plates may be electrically connected to the other end (for example the cell, housing second end) prior to the other end being joined to the sidewall. The electrical connections may be achieved, for example, by welding or other appropriate technique. Since both ends of the tubular sidewall are open, and since the cell housing first and second ends are not yet joined to the sidewall, electrical connection of both the negative electrode plates to the first end and the positive electrode pates to the second end is simplified and has improved reliability as compared to forming such a welded connection at a blind end of a container.

In some aspects, a terminal protrudes through one end (for example the first end) of the cell housing. The electrical connection between the electrode plates and the terminal is made using a foldable electrical connector and is performed prior to attachment of the first end to the housing sidewall. The electrical connector facilitates use of a welding process to connect one end of the connector to the terminal and an opposed end of the connector to an electrode plate while the first end is separate from the sidewall. In addition, the electrical connector facilitates assembly of the first end with the sidewall so that the welding step can be performed.

DETAILED DESCRIPTION

Figure 1:
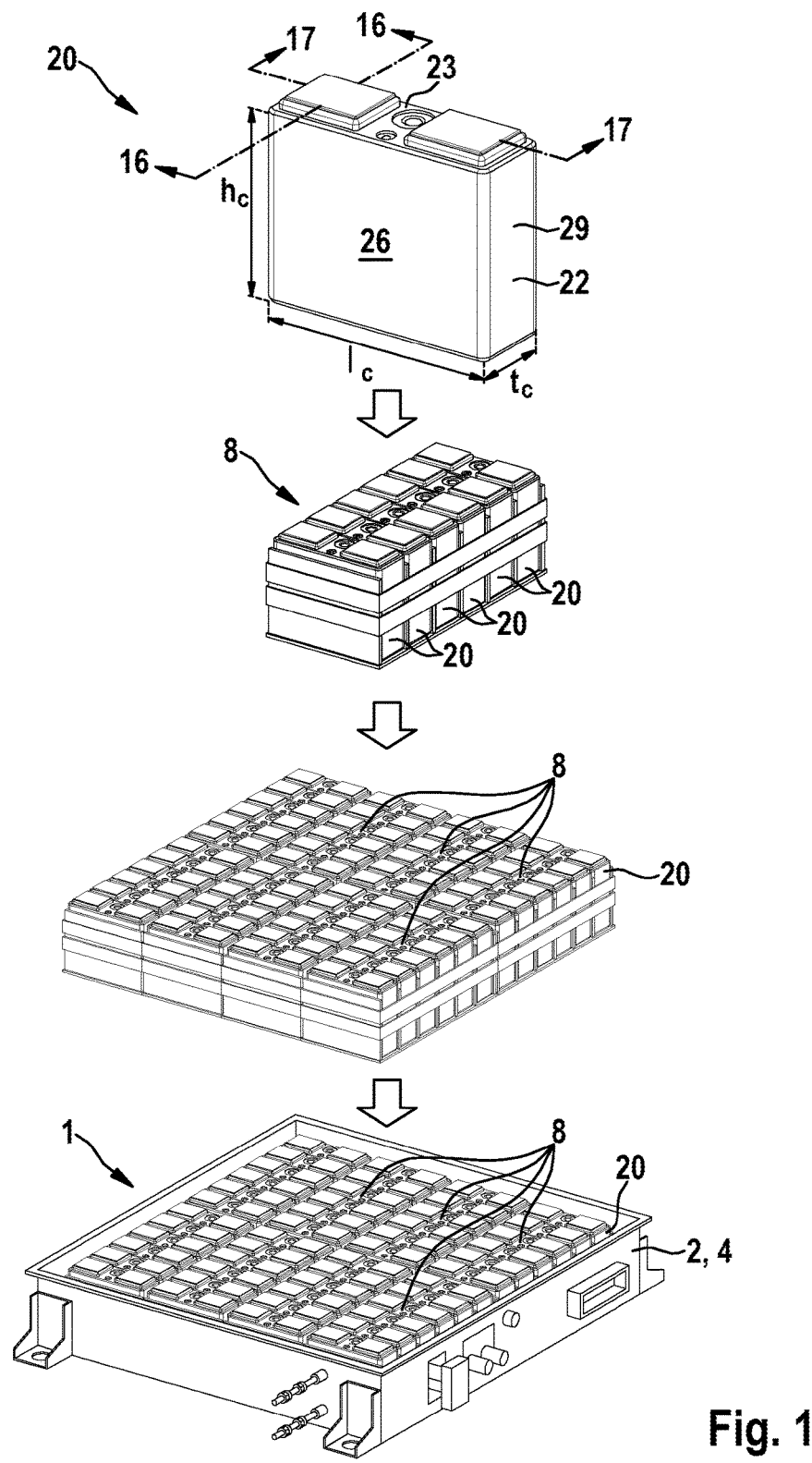
FIG. 1 illustrates the elements of a battery pack, where the elements of the battery back are shown in perspective view.
Figure 2:
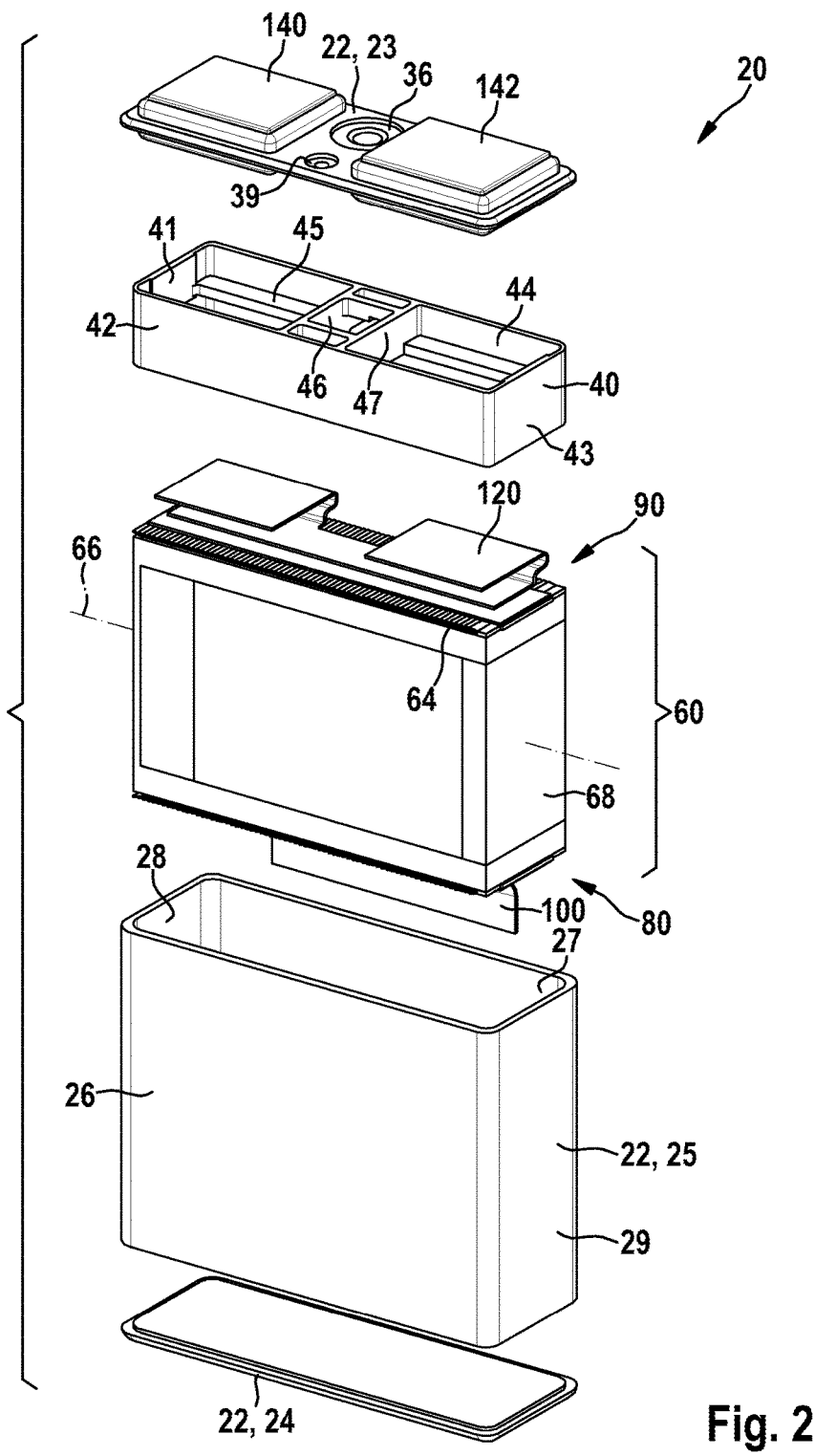
FIG. 2 is an exploded perspective view of a cell of the battery pack of FIG. 1.

Referring to FIGS. 1 and 2, a battery pack 1 used to provide electrical power includes electrochemical cells 20 that are electrically interconnected and stored in an organized manner within a battery pack housing 2. The battery pack housing 2 includes a pack container portion 4 and a detachable pack lid (not shown). The cells 20 are lithium-ion cells that include an electrode assembly 60 that is sealed within a cell housing 22 along with an electrolyte to form a power generation and storage unit. In some embodiments, groups of cells 20 may be bundled together to form battery modules 8, which in turn are stored within the battery pack housing 2. Within the battery pack housing 2, the cells 20 are electrically connected in series and/or in parallel.

Each cell 20 includes a prismatic cell housing 22. As used herein, the term "prismatic" refers to the shape of cell housing 22, and particularly refers to having a rectangular shape. In the illustrated embodiment, the cell housing 22 includes an elongated rectangular first end 23 which supports a pair of terminals 140, 142, and an elongated rectangular second end 24 that is spaced apart from, and parallel to, the first end 23. The cell housing 22 includes a sidewall 25 that joins the first end 23 to the second end 24. The sidewall 25 is a tube having a rectangular cross-sectional shape. The sidewall 25 is formed separately from each of the first and second ends 23, 24. The sidewall 25 includes a pair of major sides 26, 27 joined by a pair of minor sides 28, 29. The second major side 27 is spaced apart from, and parallel to, the first major side 26. The second minor side 29 is spaced apart from, and parallel to, the first minor side 28. In addition, each side 26, 27 of the pair of major sides is larger in area than each side 28, 29 of the pair of minor sides. The first end 23, the second end 24 and the sidewall 25 together define a sealed interior space occupied by the electrode assembly 60.

The cell housing 22 has a length $l_c$ that extends in parallel to the first major side 26 and a thickness $t_c$ that extends in parallel to the first minor side 28. The cell housing 22 has a height $h_c$ that is perpendicular to both the length $l_c$ and the thickness $t_c$, and corresponds to the spacing between the first and second ends 23, 24. In some embodiments, the ratio of the length $l_c$ to the thickness $t_c$ is in a range of 2:1 to 5:1. For example, in the illustrated embodiment, the ratio of the length $l_c$ to the thickness $t_c$ is 3.0. The height $h_c$ of the cell housing 22 is limited only by the requirements of the specific application. In the illustrated embodiment, the ratio of the length $l_c$ to the height is 1.3.

The cell housing 22 is formed of an electrically conductive material, such as metal. Thus, the cell housing 22 is rigid as compared to some other types of electrochemical cell housings such as pouch-type cell housings that are formed of a flexible laminate material.

Figure 3:
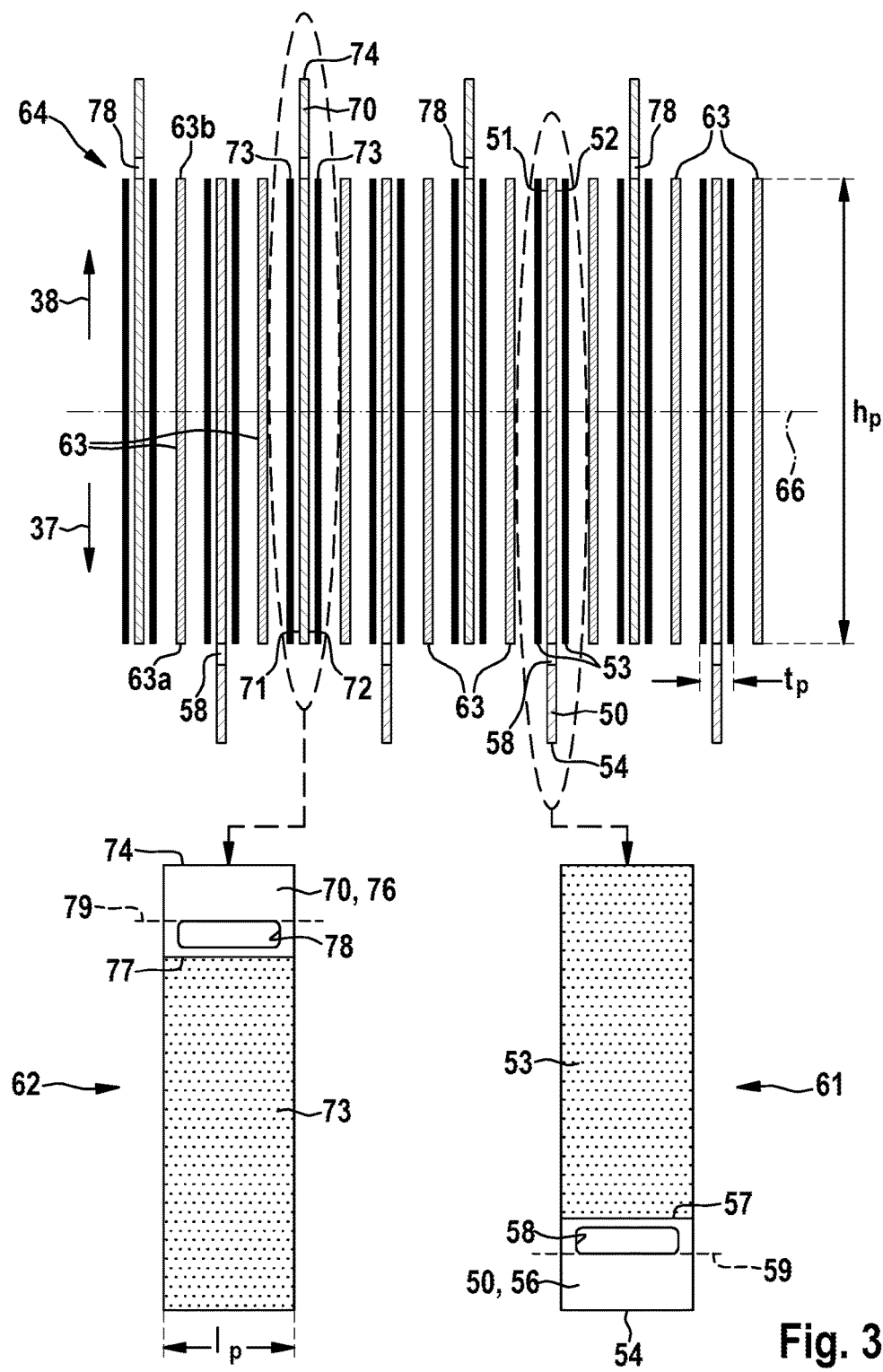
FIG. 3 is a schematic cross-sectional view of a portion of the electrode stack of the cell of FIG. 2, including a detail plan view of an isolated positive electrode plate and an isolated negative electrode plate.
Figure 4:
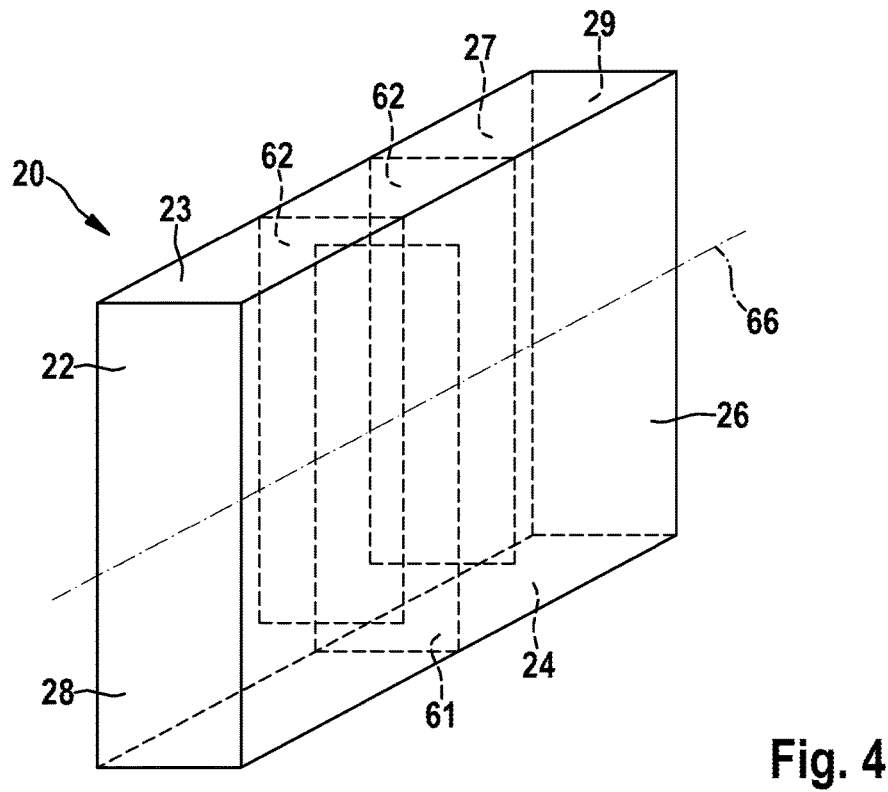
FIG. 4 is a schematic perspective view of the cell illustrating the orientation of the electrode plates within the cell housing.

Referring to FIGS. 3 and 4, the electrode assembly 60 is disposed in the cell housing 22 and includes a series of stacked positive electrode plates 61 alternating with negative electrode plates 62 and separated by an intermediate z-folded separator 63.

Each of the positive and negative electrode plates 61, 62 may have a layered structure to facilitate insertion and/or movement of lithium-ions. For example, in the illustrated embodiment, the positive electrode plate 61 includes a first substrate 50 formed of a first electrically-conductive material such as aluminum. In addition, the positive electrode plate 61 includes a coating formed of a first active material 53 such as a litigated metal oxide disposed on both sides 51, 52 of the first substrate 50. The first active material 53 is applied for example in a slurry coating process, printing process or other appropriate process. The first active material 53 covers the sides 51, 52 of the positive electrode plate 61 except within a narrow coating-free region along one lengthwise edge 54 of the positive electrode plate 61, whereby a positive clear lane 56 of bare substrate is provided along the lengthwise edge 54 of the positive electrode plate 61. The positive clear lane 56 is electrically conductive and free of active material. Each positive electrode plate 61 includes an opening 58 disposed in the positive clear lane 56. The opening 58 is elongated in the lengthwise direction, and is closer to the boundary 57 between the first active material 53 and the plate lengthwise edge 54 than to the plate lengthwise edge 54. The opening 58 receives a portion of a first current collector assembly 80, as discussed in detail below.

The negative electrode plate 62 includes a second substrate 70 formed of a second electrically-conductive material such as copper. In addition, the negative electrode plate 62 includes a coating formed of a second active material 73 such as graphite disposed on both sides 71, 72 of the second substrate 70. The second active material 73 is applied for example in a slurry coating process, printing process or other appropriate process. The second active material 73 covers the sides 71, 72 of the negative electrode plate 62 except within a narrow coating-free region along one lengthwise edge 74 of the negative electrode plate 62, whereby a negative clear lane 76 of bare substrate is provided along the lengthwise edge 74 of the negative electrode plate 62. The negative clear lane 76 is electrically conductive and free of active material. Each negative electrode plate 62 includes an opening 78 disposed in the negative clear lane 76. The opening 78 is elongated in the lengthwise direction, and is closer to the boundary 77 between the second active material 73 and the plate lengthwise edge 74 than to the plate lengthwise edge 74. The opening 78 receives a portion of a second current collector assembly 90, as discussed in detail below.

Each of the positive and negative electrode plates 61, 62 are elongated rectangular plates. The electrode plates 60, 61 are very thin, and thus are often referred to as foils. For example, in the illustrated embodiment, the electrode plates 60, 61 have a substrate thickness of about 0.012 mm, and a coated thickness $t_p$ of about 0.108 mm. The electrode plates 60, 61 have a plate length $l_p$ that is much greater than the plate thickness $t_p$, having for example a plate length $l_p$ on the order of tens of mm. The plate height $h_p$ is determined by the height $h_c$ of the cell housing 22, and thus may also be on the order of tens of mm. In the illustrated embodiment, the electrode plates 60, 61 have a plate height $h_p$ that is greater than the plate length $l_p$. For example, in some embodiments, the ratio of plate height $h_p$ to plate length $l_p$ is about 2:1.

The separator 63 is a permeable membrane that functions to keep the positive and negative electrode plates 61, 62 apart to prevent electrical short circuits while also allowing passage of ionic charge carriers provided in the electrolyte and that are needed to close the circuit during the passage of current within the cell 20. The separator 63 is formed of, for example, an electrically insulating material such as a trilayer polypropylene-polyethylene-polypropylene membrane.

During stacking of the electrode assembly 60, the positive electrode plates 61, the negative electrode plates 62 and the separator 63 that form the electrode assembly 60 are arranged in a layered or stacked configuration in the stacking direction. The series of stacked electrode plates 61, 62 and separator 63 will be referred to herein as the "electrode stack" 64, and a stack axis 66 of the electrode stack 64 extends through a center of the electrode stack 64 in a direction parallel to the stacking direction and perpendicular to the coated surfaces 51, 52, 71, 72 of the electrode plates 61, 62. A portion of the electrode stack 64 is shown schematically in FIG. 3. In the stacked configuration, the separator 63 is folded in a Z configuration such that peripheral edges and the folds of the separator 63 are aligned in a direction parallel to the stack axis 66.

The positive and negative electrode plates 61, 62 are disposed in alternating folds of the separator 63 so as to be parallel and overlie each other. In addition, the positive and negative electrode plates 61, 62 are partially offset in a direction transverse to the stack axis and in the height direction of the electrode plate relative to the respective separator 63. In particular, the positive electrode plates 61 are stacked along the stack axis 66 such that peripheral edges of the positive electrode plates 61 are aligned with each other in a direction parallel to the direction of the stack axis 66 but are partially offset relative to the separator 63 in a first direction parallel to the height direction. The first direction is represented in FIG. 3 by arrow 37. In particular, the positive electrode plate 61 is arranged relative to the separator 63 such that the positive clear lane 56 of each of the positive electrode plates 61 extends beyond a corresponding edge 63a of the separator 63.

The negative electrode plates 62 are stacked along the stack axis 66 such that peripheral edges of the negative electrode plates 62 are aligned with each other in a direction parallel to the direction of the stack axis 66 but are partially offset relative to the separator 63 in a second direction, where the second direction is parallel to the height direction and opposed to that of the first direction. The second direction is represented in FIG. 3 by arrow 38. In particular, the negative electrode plate 62 is arranged relative to the separator 63 such that the negative clear lane 76 of each of the negative electrode plates 62 extends beyond a corresponding edge 63b of the separator 63.

When the electrode assembly 60 is disposed in the cell housing 22, the positive electrode plate 61 is offset relative to the separator 63 toward the cell housing second end 24, and the negative electrode plate 62 is offset relative to the separator 63 toward the cell housing first end 23. In addition, the separator 63 is oriented so that the fold edges 65 of the separator 63 abut the major sides 26, 27 of the cell housing 20 and extend between the cell housing first and second ends 23, 24. The electrode plates 61, 62 are disposed in the folds of the separator 63 so that the coated surfaces 51, 52, 71, 72 of the electrode plates 61, 62 are parallel to the cell housing minor sides 28, 29 and so that the stack axis 66 extends in a direction perpendicular to the cell housing minor sides 28, 29.

Figure 5:
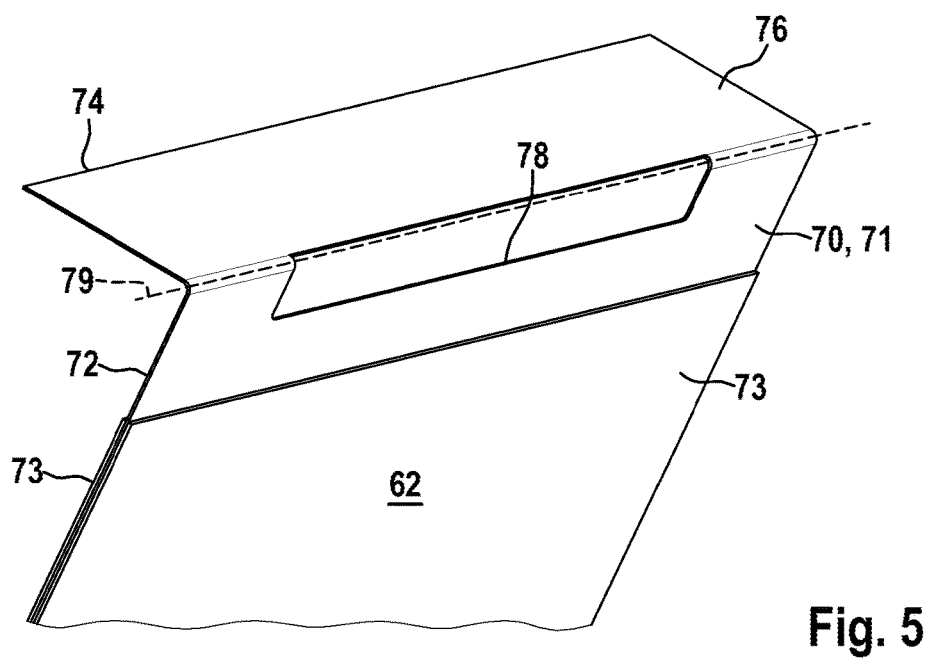
FIG. 5 is a perspective view of a portion of an electrode plate illustrating a folded clear lane.
Figure 6:
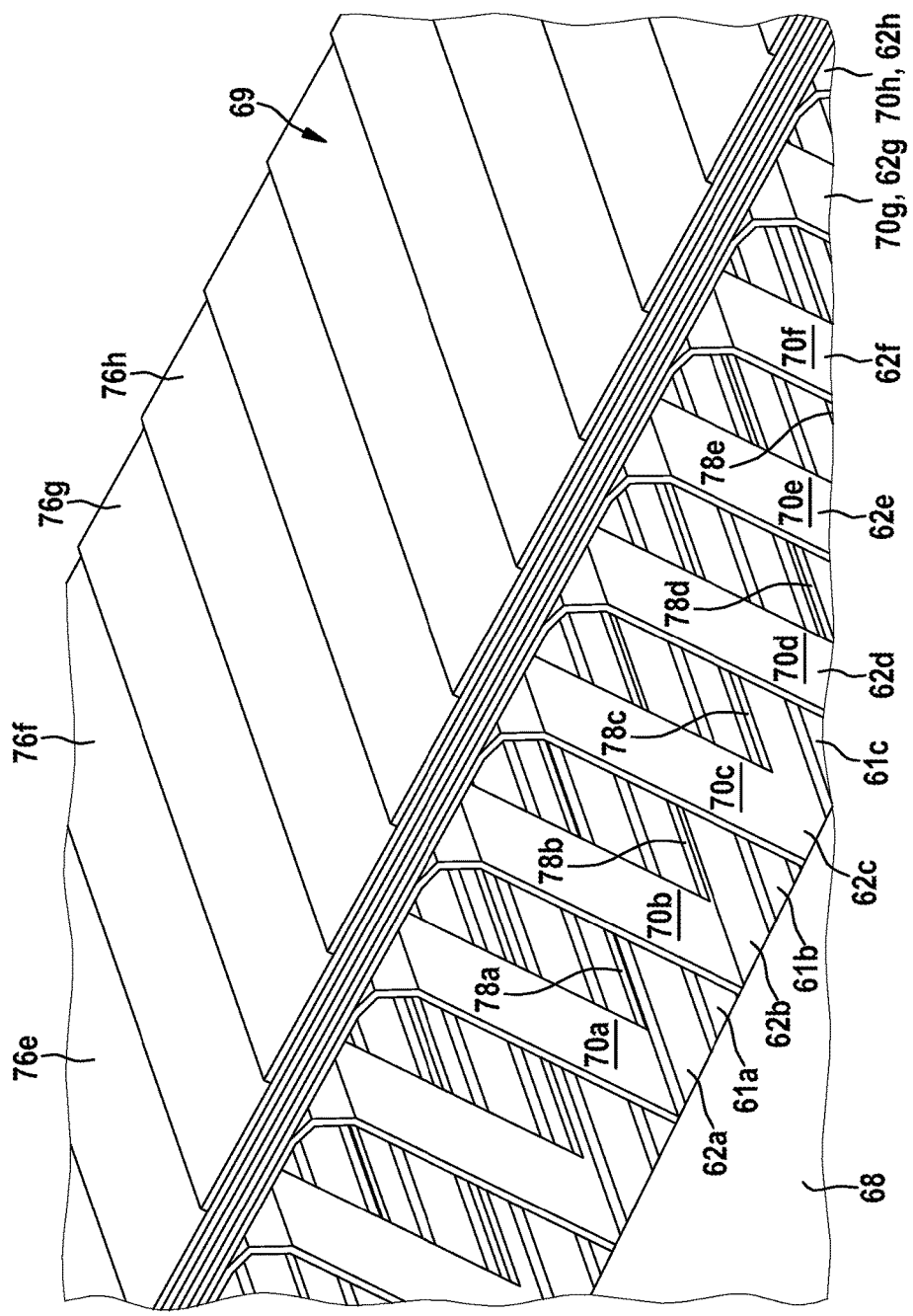
FIG. 6 is a perspective view of a portion of the electrode stack illustrating the overlapping louvered configuration of electrode plates of a common polarity. The current collector assembly is omitted from this figure to permit visualization of the openings in each electrode plate.

Referring to FIGS. 5-6, the clear lane 56 of each positive electrode plate 61 is folded against a side of the electrode stack 64. Likewise, the clear lane 76 of each negative electrode plate 62 is folded against the opposed side of the electrode stack 64. As seen in FIG. 5, the clear lanes 56, 76 are folded along an outer margin of the opening 58, 78 (FIG. 5 shows only the negative electrode plate 62). Due to the relative spacing of the individual electrode plates 61, 62 along the stack axis 66, the folded clear lanes 56, 76 form an overlapping louvered configuration in which a portion of each clear lane 56, 76 is exposed and faces an inner side of the cell housing 22. The folded clear lanes 56, 76 on a given side of the electrode stack 64 cooperate to form a generally planar electrically conductive surface 69 that can be used to form an electrical connection with a corresponding current collection assembly 80, 90 as discussed further below.

Referring again to FIG. 2, the electrode assembly 60 may optionally include insulating band 68 that tightly encircles the electrode stack 64. As a result, the insulating band 68 is disposed between the electrode stack 64 and the sidewall 25. In this configuration, the clear lanes 56, 76 are not enclosed by the insulating band 68, and instead protrude from, and are exposed at, opposed open ends of the insulating band 68. The insulating band 68 maintains the electrode stack 64 in a compressed state in a direction parallel to the stack axis 66, and facilitates insertion of the electrode stack 64 into the cell housing 22 during cell assembly, as discussed further below.

Figure 7:
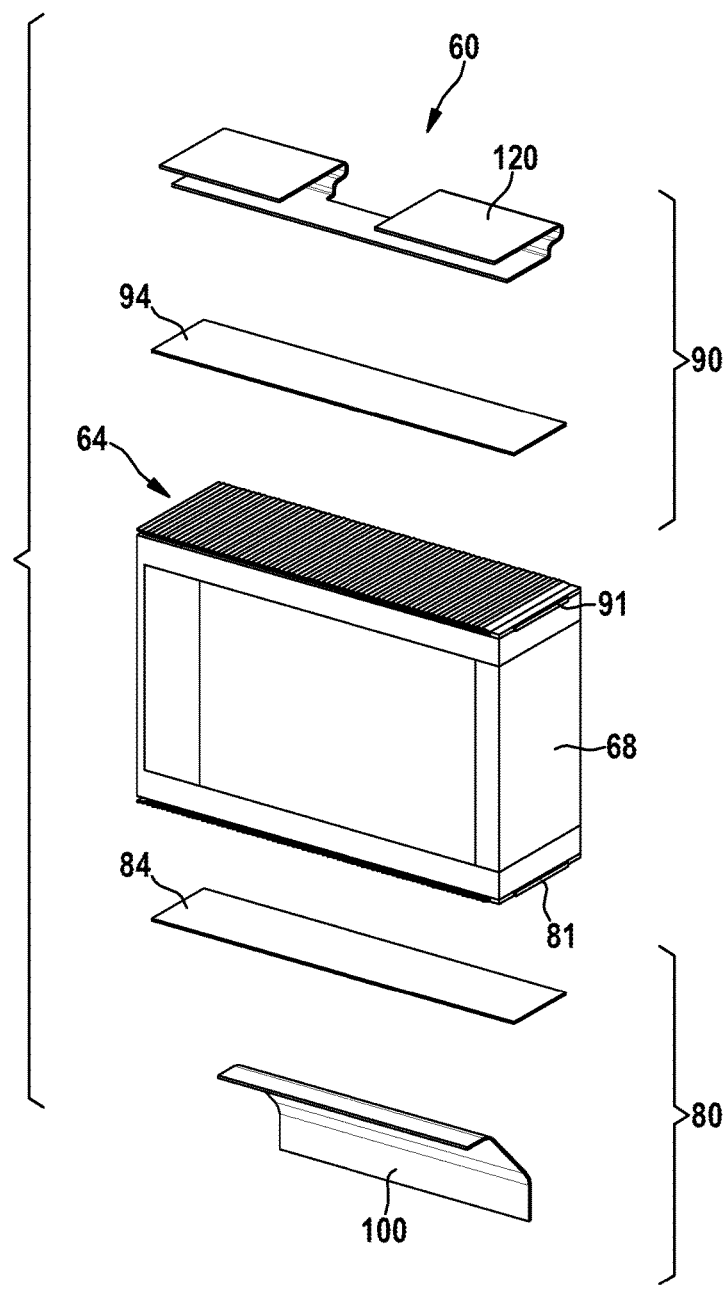
FIG. 7 is an exploded perspective view of the electrode assembly of the cell.
Figure 8:
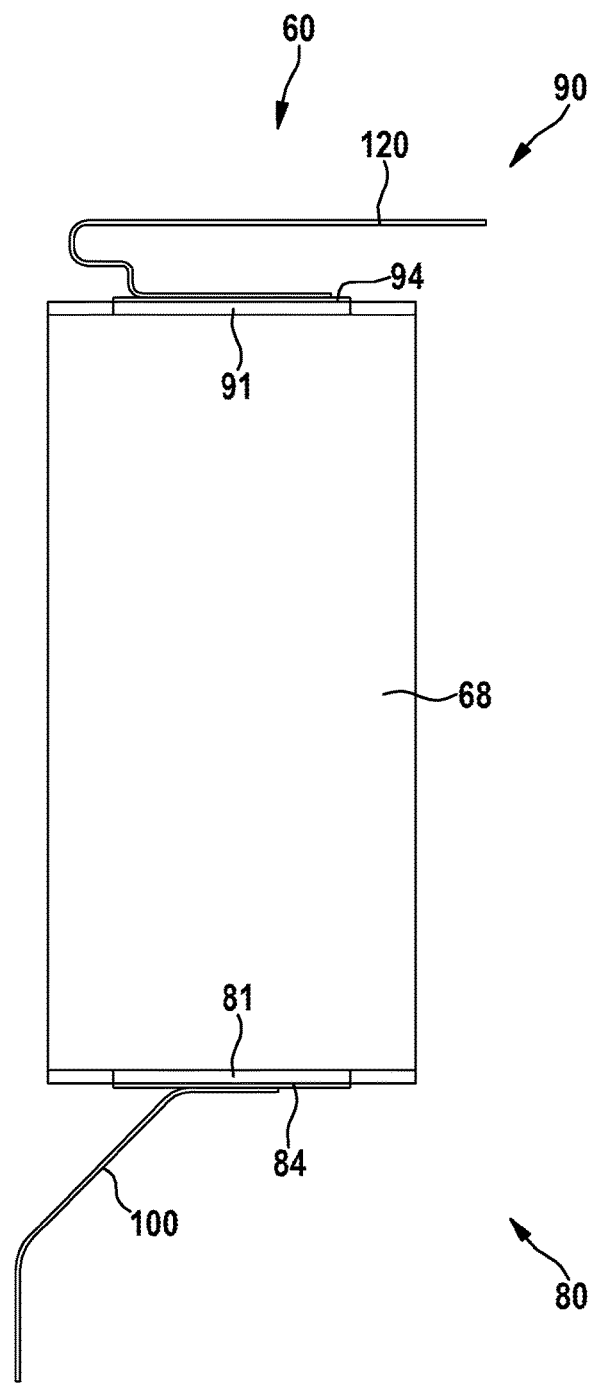
FIG. 8 is a side view of the electrode assembly of the cell.

Referring to FIGS. 7 and 8, the electrode assembly 60 also includes a first current collector assembly 80 and a second current collector assembly 90 that form an electrical connection with the electrode plates 61, 62 of the electrode stack 64. The first current collector assembly 80 is disposed between the electrode stack 64 and the cell housing second end 24, and forms an electrical connection with the positive electrode plates 61 of the electrode assembly 60. The second current collector assembly 90 is on the opposed side of the electrode stack 64 so as to be disposed between the electrode stack 64 and the cell housing first end 23, and forms an electrical connection with the negative electrode plates 62 of the electrode assembly 60.

Figure 9:
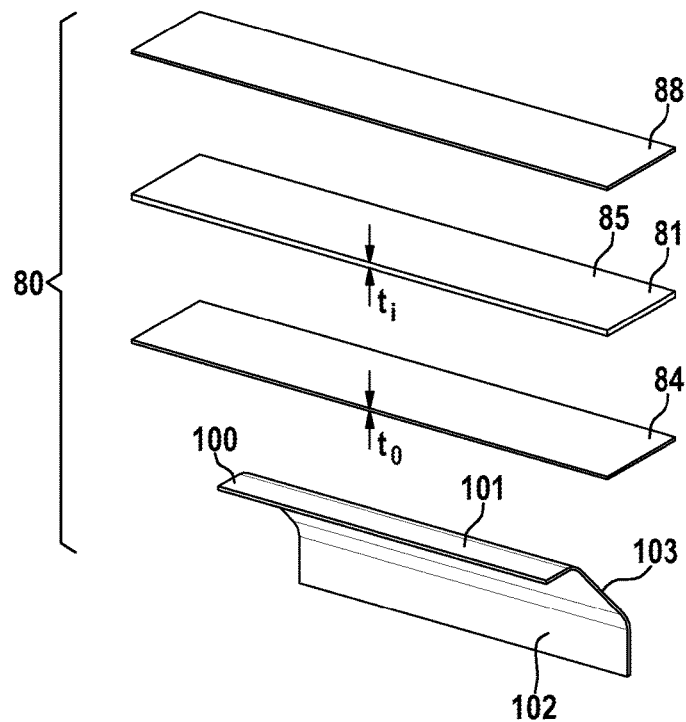
FIG. 9 is an exploded perspective view of the first current collector assembly.

Referring to FIG. 9, the first current collector assembly 80 includes an electrically conductive first inner plate 81 and an electrically conductive first outer plate 84 that is parallel to the first inner plate 81. The first inner plate 81 and the first outer plate 84 are formed of the same material as the first substrate 50 used to form the positive electrode plates 61. The first inner plate 81 has a rectangular cross-section that is dimensioned to be slightly smaller than the openings 58 of the positive electrode plates 61. The first inner plate 81 extends through the opening 58 of each of the positive electrode plates 61. In addition, the first inner plate 81 is disposed between each of folded portions of the positive clear lanes 56 and the electrode stack 64. This is achieved, for example, by sliding the opening 58 of each positive electrode plate 61 onto the first inner plate 81 during electrode plate stacking, and prior to folding the positive clear lanes 56.

The first outer plate 84 overlies the first inner plate 81 such that the folded positive clear lanes 56 are disposed between, and form an electrical connection with, the first outer plate 84 and the first inner plate 81. In the illustrated embodiment, the first outer plate 84, the first inner plate 81 and the folded portions of the positive clear lanes 56 are electrically connected via welding.

In some embodiments, an insulating sheet 88 is disposed between the first inner plate 81 and an inner margin of the positive electrode plate opening 58 to prevent an electrical short circuit between the first inner plate 81 and a peripheral edge of the negative electrode plates 62. In some embodiments, the insulating sheet 88 may be an electrically insulating adhesive tape that is secured to the inward-facing (e.g., electrode stack-facing) side 85 of the first inner plate 81.

The first current collector assembly 80 also includes a first connector 100 that is used to form the electrical connection between the first outer plate 84 and the cell housing second end 24. The first connector 100 is disposed in the cell housing 22 between the first outer plate 84 and the cell housing second end 24. The first connector 100 is formed of an elongated, electrically conductive strip of material that is partially folded along fold lines that are parallel to the direction of strip elongation and segregate the first connector 100 into portions. In particular, the first connector 100 includes a first leg portion 101 that is connected to a second leg portion 102 via a base portion 103. Prior to assembly within the cell housing, the first and second leg portions 101, 102 are each at an obtuse angle relative to the base portion 103 (FIGS. 7-9), whereby the first connector 100 has a splayed U shape when seen in cross-section. The first leg portion 101 is electrically connected, for example by welding, to the first outer plate 84. In addition, the second leg portion 102 is electrically connected, for example by welding, to the cell housing second end 24. The electrical connection is made, prior to connection of the cell housing second end 24 to the tubular sidewall 25, and thus the splayed U shape configuration of the first connector 100 facilitates access to the surfaces to be welded. As discussed further below, when the first current collector assembly 80 is assembled within the cell housing 22, the base portion 103 is further folded such that the second leg portion 102 closely overlies and is parallel to the first leg portion 101 to form a flattened U-shape configuration (not shown). In addition, the fold of the base portion 103 extends in parallel to the major sides 26, 27 of the cell housing 22. Since first and second legs 101, 102 of the first connector 100 have relatively large surfaces, the area of electrical connection between the first outer plate 84 and the first connector 100, and the area of electrical connection between the first connector 100 and the housing second end 24 can each be made large. In addition, since the first connector 100 is folded into the flattened U-shape configuration during assembly, the first connector 100 is made compact while providing a large electrical connection area. In the illustrated embodiment, the first current collector assembly 80 is electrically connected to the positive electrode plates 61, whereby the cell housing 22 has a positive electrical polarity and serves as the positive terminal of the cell 20.

Figure 10:
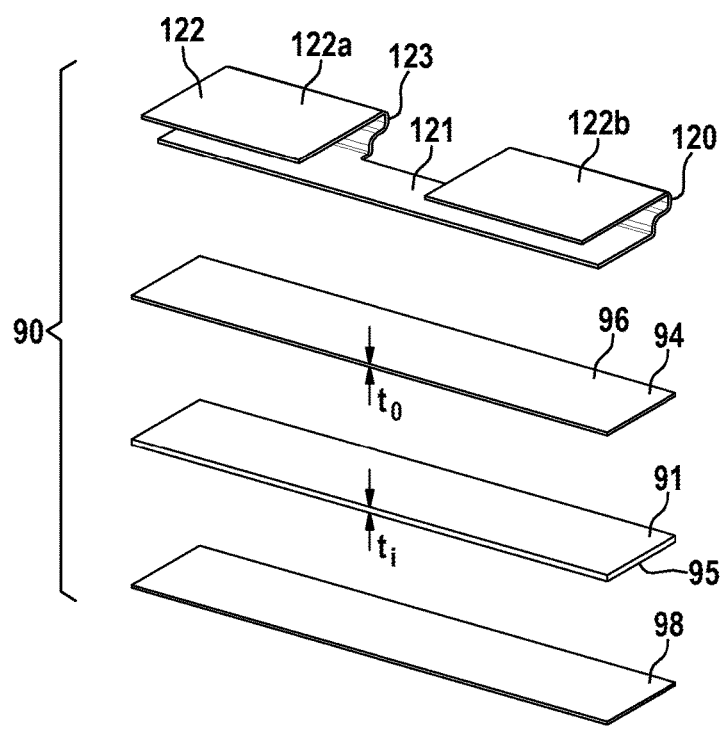
FIG. 10 is an exploded perspective view of the second current collector assembly.
Figure 11:
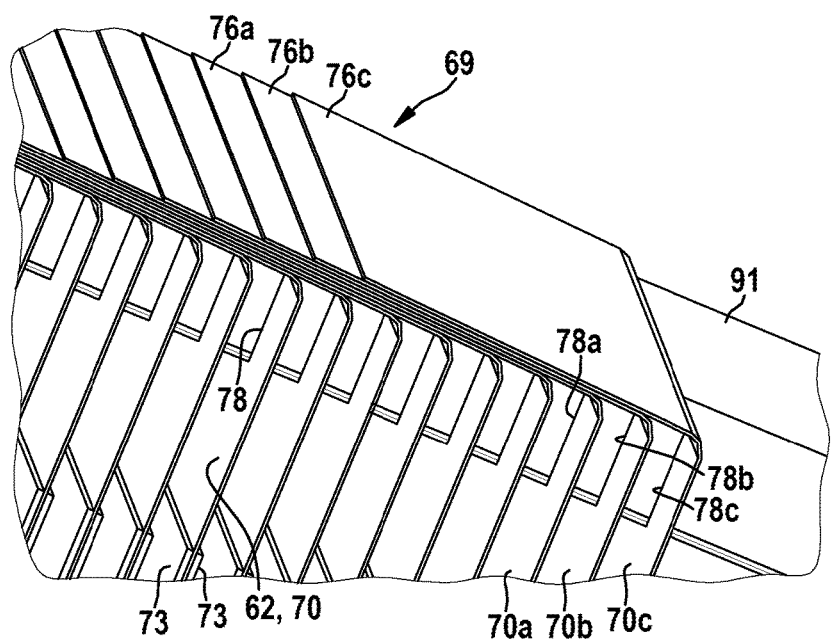
FIG. 11 is a perspective view of a portion of the electrode stack illustrating the overlapping louvered configuration of electrode plates of a common polarity. The inner plate of the current collector assembly is included in this figure.
Figure 12:
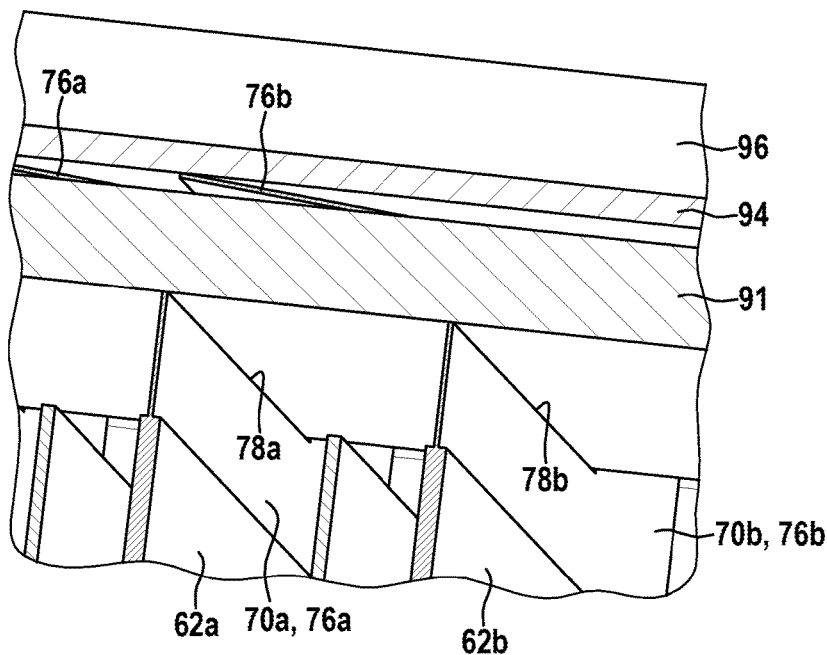
FIG. 12 is a perspective view of a portion of the electrode stack illustrating the overlapping louvered configuration of electrode plates of a common polarity. The inner plate and the outer plate of the current collector assembly are included in this figure.

Referring to FIGS. 10-12, like the first current collector assembly 80, the second current collector assembly 90 includes an electrically conductive second inner plate 91 and an electrically conductive second outer plate 94 that is parallel to the second inner plate 91. The second inner plate 91 and the second outer plate 94 are formed of the same material as the second substrate 70 used to form the negative electrode plates 62. The second inner plate 91 has a rectangular cross-section that is dimensioned to be slightly smaller than the openings 78 of the negative electrode plates 62. The second inner plate 91 extends through the openings 78 of each of the negative electrode plates 62 (FIG. 11). In addition, the second inner plate 91 is disposed between each of folded portions of the negative clear lanes 76 and the electrode stack 64. This is achieved, for example, by sliding the opening 78 of each negative electrode plate 62 onto the second inner plate 91 during electrode plate stacking, and prior to folding the negative clear lanes 76.

The second outer plate 94 overlies the second inner plate 91 such that the folded negative clear lanes 76 are disposed between, and form an electrical connection with, the second outer plate 94 and the second inner plate 91 (FIG. 12). In the illustrated embodiment, the second outer plate 94, the second inner plate 91 and the folded portions of the negative clear lanes 76 are electrically connected for example via welding.

In some embodiments, an insulating sheet 98 is disposed between the second inner plate 91 and an inner margin of the negative electrode plate opening 78 to prevent an electrical short circuit between the second inner plate 91 and a peripheral edge of the positive electrode plates 61. In some embodiments, the insulating sheet 98 may be an electrically insulating adhesive tape that is secured to the inward-facing (e.g., electrode stack-facing) side 95 of the second inner plate 91.

The second current collector assembly 90 also includes a second, connector 120 that is used to form the electrical connection between the second outer plate 94 and each of the terminals 140, 142. The second connector 120 is disposed in the cell housing 22 between the second outer plate 94 and the cell housing first end 23. The second connector 120 is formed of an elongated, electrically conductive strip of material that is partially folded along a fold line that is parallel to the direction of strip elongation and segregates the second connector 120 into leg portions. In particular, the second connector 120 includes a first leg portion 121 that is connected to a second leg portion 122 via the fold, which corresponds to a base portion 123. Prior to assembly within the cell housing, the first and second leg portions 121, 122 are each at an obtuse angle relative to the base portion 123 (not shown), whereby the second connector 120 has a splayed U shape when seen in cross-section. Material is removed from a central portion of the base portion 123 and second leg 122, whereby the second leg portion 122 forms a pair of spaced tabs 122a, 122b. The first leg portion 121 is electrically connected, for example by welding, to the second outer plate 94. In addition, the second leg portion 122 is electrically connected, for example by welding, to each of the terminals 140, 142. More specifically, the first tab 122a is connected to the first terminal 140, and the second tab 122b is connected to the second terminal 142. The electrical connections are made prior to connection of the cell housing first end 23 to the tubular sidewall 25, and thus the splayed U shape configuration of the second connector 120 facilitates access to the surfaces to be welded. As discussed further below, when the second current collector assembly 90 is assembled within the cell housing 22, the base portion 123 is further folded such that the second leg portion 122 closely overlies and is parallel to the first leg portion 121 to form a flattened U-shape configuration (FIG. 10). In addition, the fold of the base portion 123 extends in parallel to the major sides 26, 27 of the cell housing 22. Since first and second legs 121, 122 of the second connector 120 have relatively large surfaces, the area of electrical connection between the second outer plate 84 and the second connector 120, and the area of electrical connection between the second connector 120 and the respective terminals 140, 142 can each be made large. In addition, since the second connector 120 is folded into the flattened U-shape configuration during assembly, the second connector 120 is made compact while providing a large electrical connection area. In the illustrated embodiment, the second current collector assembly 90 is electrically connected to the negative electrode plates 62, whereby the terminals 140, 142 each have a negative electrical polarity.

The first and second inner plates 81, 91 have a thickness that is greater than the thickness of the first and second outer plates 84, 94, and a width that is slightly less than the width of the openings 58, 78 in the electrode plates 61, 62. In some embodiments, the ratio of the thickness $t_{inner}$ of the first inner plate 81 or second inner plate 91 to the thickness $t_{outer}$ of the first outer plate 84 or second outer plate 94 is in a range of 2:1 to 4:1. For example, in the illustrated embodiment, the first inner plate 84 has a thickness of about 0.75 mm and the first outer plate 81 has a thickness of about 0.25 mm, whereby the ratio of $t_{inner}$ to $t_{outer}$ is about 3:1. By sandwiching the folded clear lanes 56, 76 between the respective inner plates 81, 91 and outer plates 84, 94, it is possible to weld the electrode plates 61, 62 to the inner and outer plates 81, 91, 84, 94 without burning the electrode plates away via the heat of the welding process. In addition, by providing the first and second inner plates 81, 91 with a greater thickness than the first and second outer plates 84, 94, it is possible achieve reliable welding of the outer plates to the inner plates without damaging the coated portions of the electrode plates 61, 62, since the inner plates 81, 91 serve as a relative heat sink.

Figure 13:
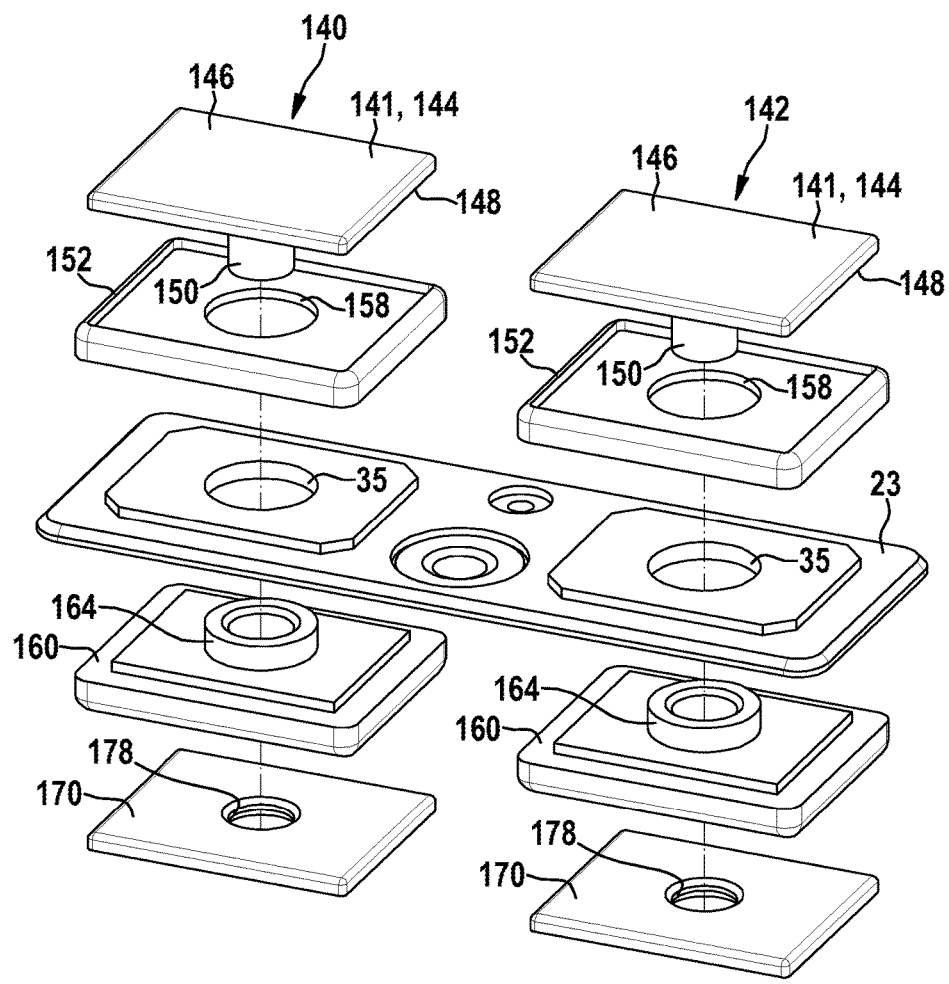
FIG. 13 is an exploded perspective view of the pair of terminals.
Figure 14:
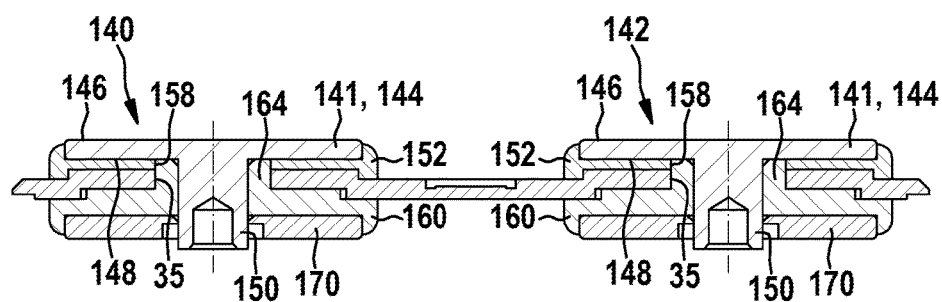
FIG. 14 is a side cross-sectional view of the pair of terminals.

Referring to FIGS. 13 and 14, as previously discussed, the second current collector assembly 90 is electrically connected to the pair of electrically conductive terminals 140, 142. Each terminal 140, 142 of the pair of terminals is identical, whereby only one terminal 140 will be described in detail, and common reference numbers will be used to refer to common elements.

The terminal 140 protrudes through the cell housing first end 23, and includes an external contact portion 141 that is electrically conductive and serves as an external electrical contact of the cell 20. The terminal 140 includes an electrically conductive internal contact portion 170 that provides an electrical connection between the external contact portion 141 and the second outer plate 94. In particular, the external contact portion 141 includes a contact plate 144 having an outward facing surface 146 and an opposed inward-facing surface 148. A post 150 protrudes from the inward facing surface 148. The post 150 is received within, and forms an electrical connection with, an opening 178 formed in the internal contact portion 170.

The terminal 140 is electrically isolated from the cell housing first end 23. To that end, the terminal 140 includes an external insulating seat 152 that receives the external contact portion 141 and separates it from an outer surface of the cell housing first end 23, and an internal insulating seat 160 that receives the internal contact portion 170 and separates it from the inner surface of the cell housing first end 23. A collar 164 protrudes from an outward-facing surface of the internal insulating seat 160. The collar 164 receives the post 150 and abuts the contact plate inward-facing surface 148. To this end, the collar 164 passes through respective openings 35, 158 in the cell housing first end 35 and the external insulating plate 154, whereby the terminal 140 is electrically isolated from the cell housing first end 23. Each of the external insulating seat 152 and the internal insulating seat 160 are formed of an electrically insulating material.

The contact plate 144 of the terminal 140 is generally rectangular in shape, and provides a contact surface (e.g., outward facing surface 146) that is parallel to the cell housing first end 23. The area of the contact plate outward facing surface 146 is large relative to the area of the cell housing first end 23. For example, the area of the outward facing surface 146 may be fifteen to forty percent of the area of the cell housing first end 23. In addition, a dimension (for example, length or width) of the outward facing surface 146 is greater than the dimension of the terminal 140 in a direction perpendicular to the first end 23 (for example, height), whereby the terminal 140 is low in profile.

Figure 15:
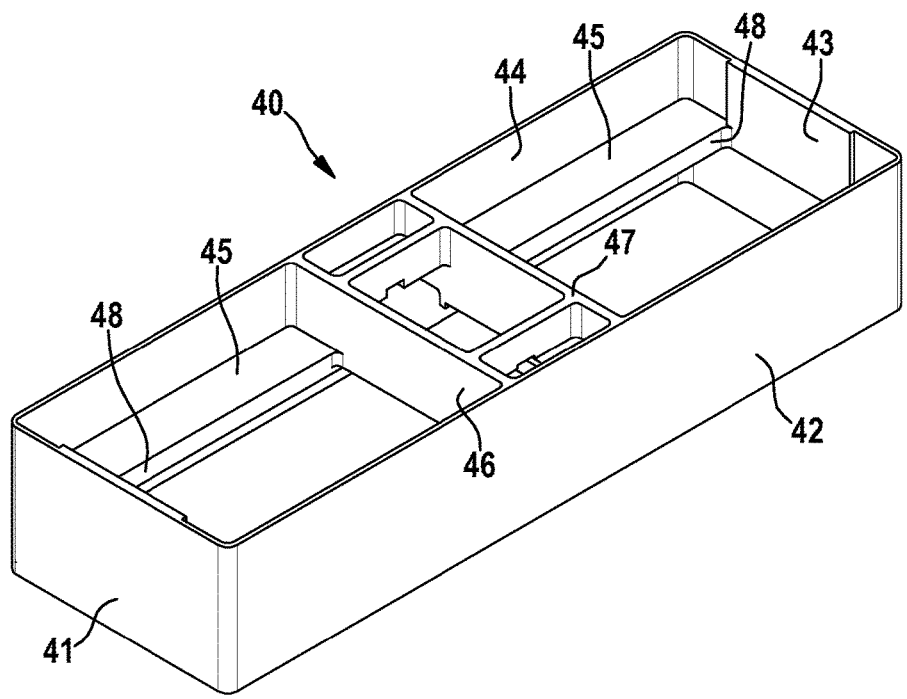
FIG. 15 is a perspective view of the insert.
Figure 16:
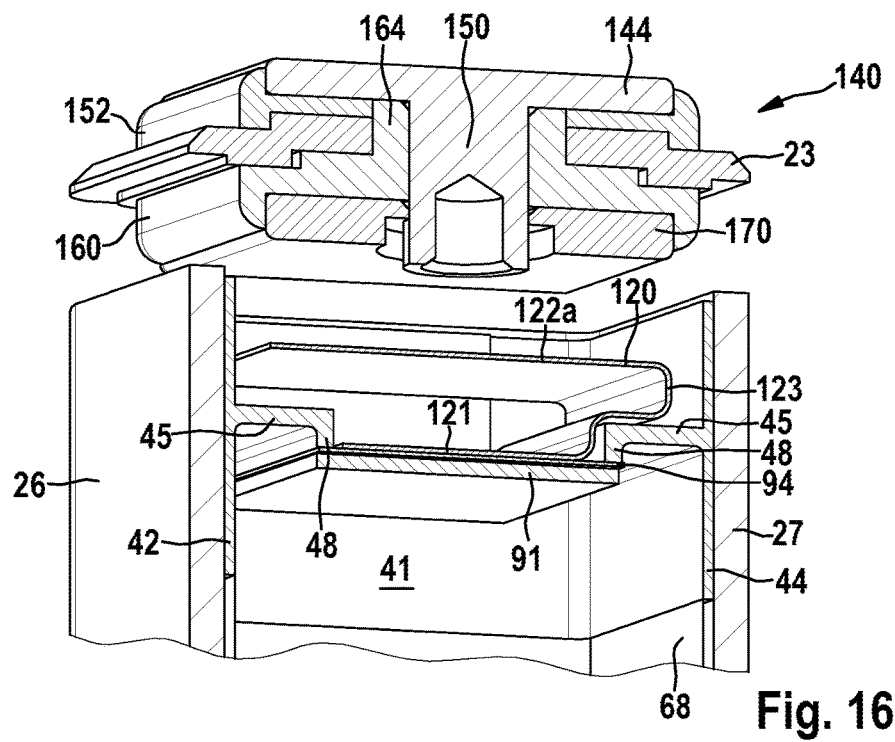
FIG. 16 is a perspective cross-sectional view of a portion of the cell as seen along line 16-16 of FIG. 1, with the electrode stack omitted for clarity.
Figure 17:
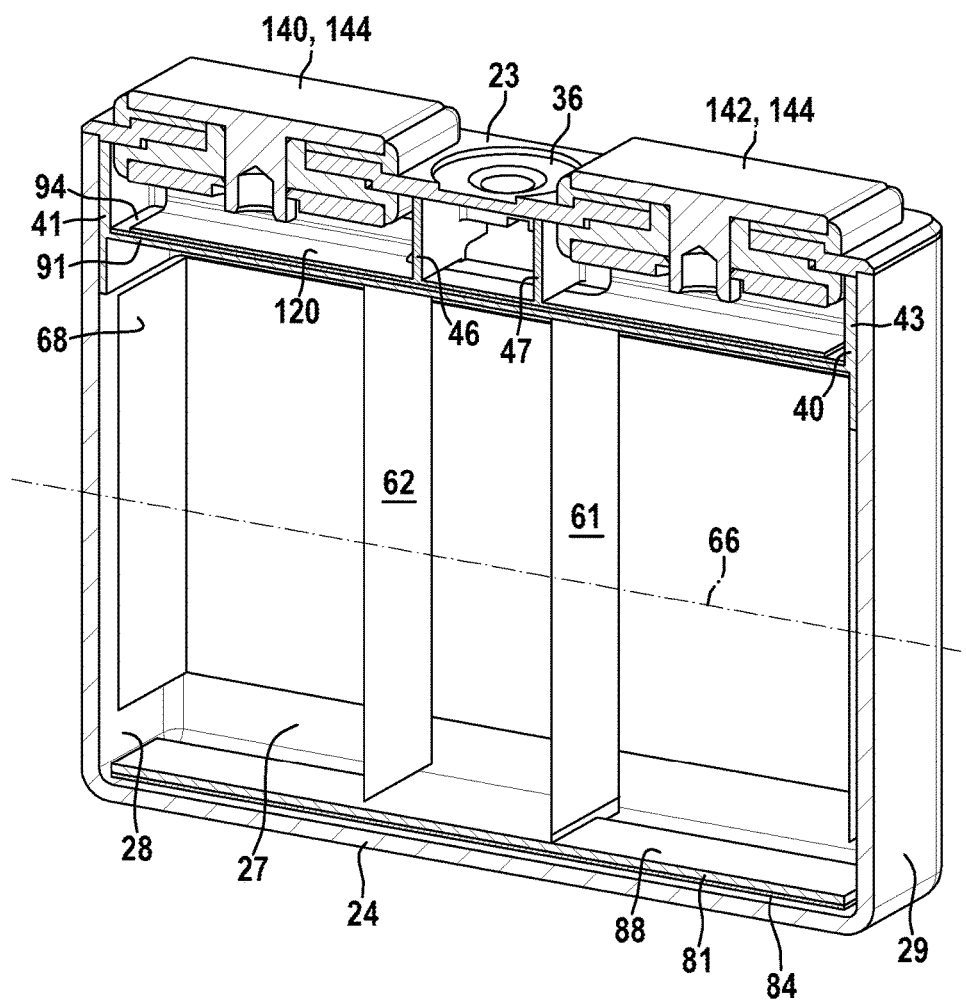
FIG. 17 is a perspective cross-sectional view of a portion of the cell as seen along line 17-17 of FIG. 1, with the electrode stack omitted for clarity with the exception of a single positive electrode plate and a single negative electrode plate.

Referring to FIGS. 15-17, an insulating insert 40 is disposed in the cell housing 22 between the electrode stack 64 and the cell housing first end 23. The insert 40 includes four rigid wall portions 41, 42, 43, 44 arranged to form a closed, elongated rectangular section, and dimensioned to surround an end of the electrode stack 64. A shelf 45 protrudes inward from an inner surface of each of the long wall portions 42, 44 of the insert 40. The shelves 45 each include a lip 48 that protrudes toward the electrode stack 64. The lip 48 is spaced apart from the long wall portions 42, 44, and is configured to abut an outward facing surface 96 of the second outer plate 94. One of the shelves 45 supports the base 123 of the second current collector connector 120 (FIG. 16). The insert 40 also includes struts 46, 47 that extend between the long wall portions 42, 44. The struts 46, 47 are located midway between the short wall portions 41, 43, and are configured to surround and protect internal structures associated with the gas relief valve 36 and electrolyte inlet port 39. The insert 40 is formed of an electrically insulating material such as plastic, and serves to isolate the end (e.g., upper end with respect to the orientation shown in FIG. 17) of the electrode stack 64, as well as to facilitate insertion of the electrode stack 64 into the sidewall 25 of the cell housing 22.

Figure 18A:
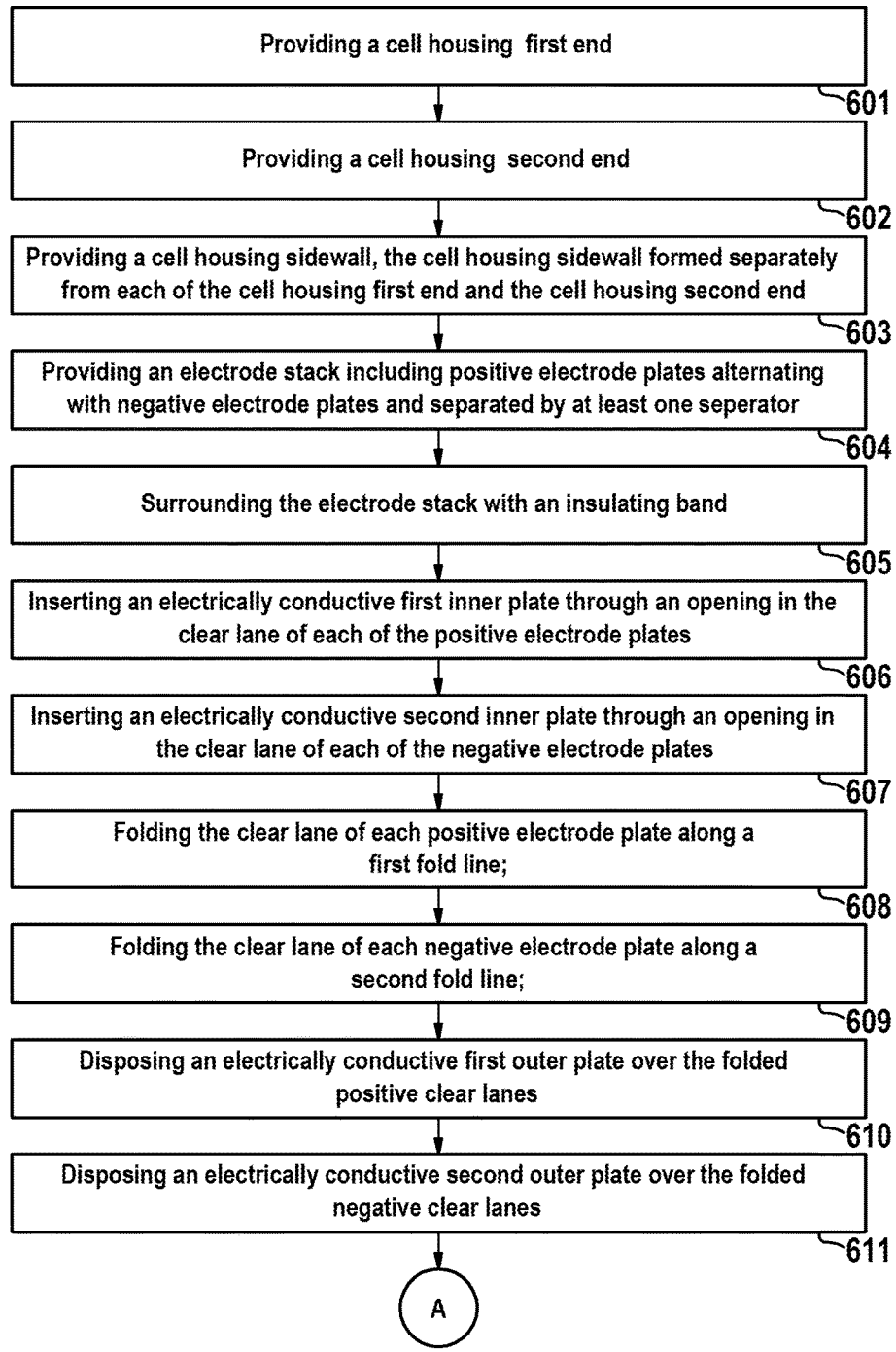
FIG. 18A and FIG. 18B are a flow diagram illustrating a method of manufacturing a cell.
Figure 18B:
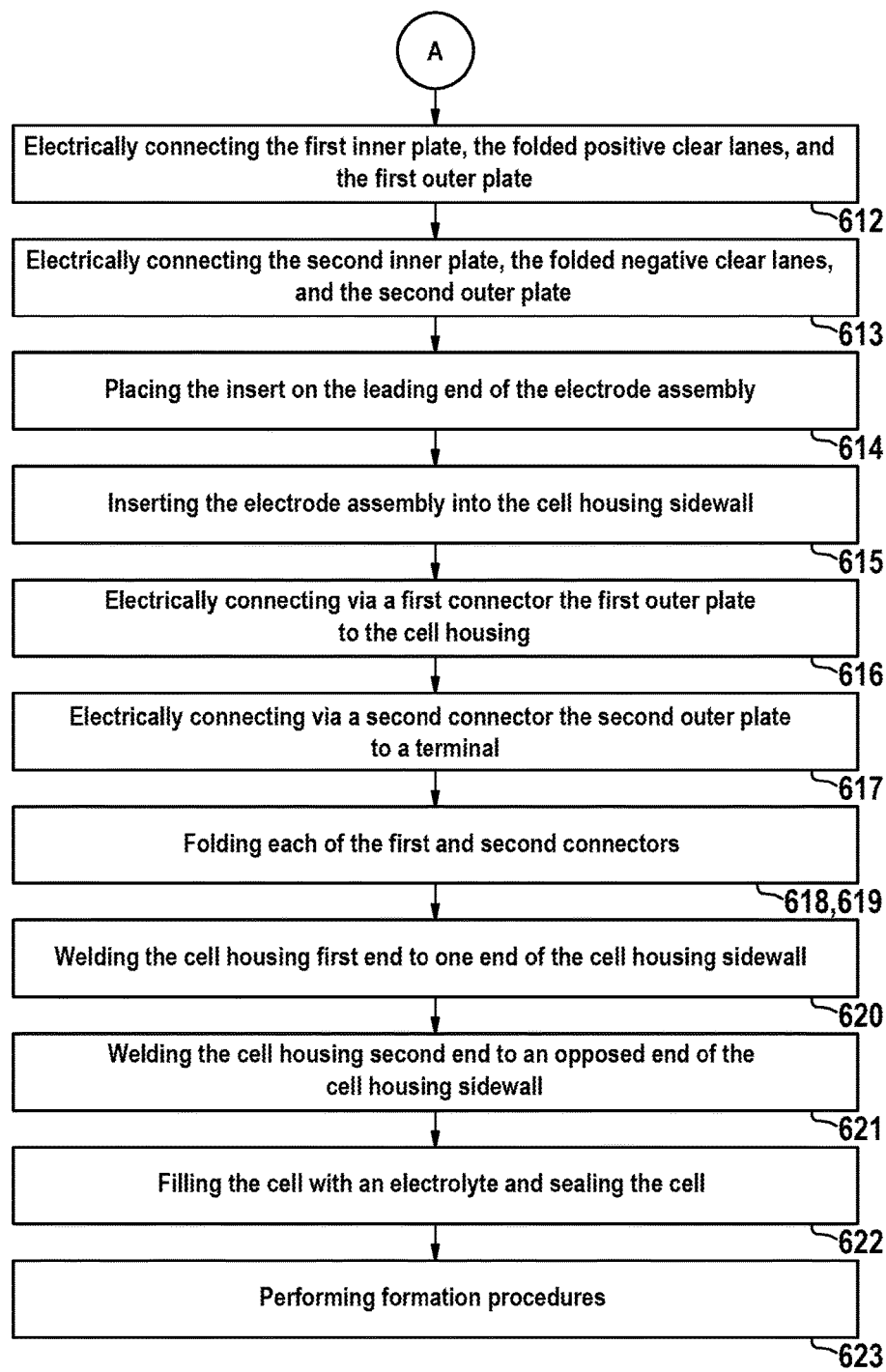

Referring to FIGS. 18A and 18B, a method of manufacturing the above-described electrochemical cell 20 will now be described. As previously discussed, the cell 20 includes a rigid cell housing 22 having the shape of a rectangular prism and an electrode assembly 60 disposed in the cell housing 22. In initial method steps, the cell housing first end 23, the cell housing second end 24 and the cell housing sidewall 25 are provided as separate elements (steps 601, 602, 603) that will be assembled together in subsequent method steps, as described below.

The cell housing sidewall 25 is a rigid tube having a rectangular cross-sectional shape, and each of the cell housing first end 23, the cell housing second end 24 and the cell housing sidewall 25 are formed of an electrically conductive material such as metal. In the illustrated embodiment, the cell housing 22 is formed of aluminum. The cell housing first end 23 includes the pair of terminals 140, 142, as described above with respect to FIGS. 13 and 14.

The electrode stack 64 of the electrode assembly 60 is also provided (step 604). To that end, the positive electrode plates 61 are stacked in an alternating manner with the negative electrode plates 62 and separated by the separator 63. During the stacking procedure, the positive electrode plates 61 and negative electrode plates 62 are offset relative to the separator 63 such that the clear lanes 56, 76 of the respective electrode plates 61, 62 protrude beyond a periphery of the separator 63, and such that the positive electrode plates 61 are offset in a direction opposed to the direction of offset of the negative electrode plates 62 (FIG. 3). In this configuration, the openings 58, 78 of the respective electrode plates 61, 62 are disposed beyond a periphery of the separator.

The insulating band 68 is then wrapped around the stacked arrangement of positive and negative electrode plates 61, 62 and separator so as to tightly encircle the electrode stack 64 (step 605). The insulating band 68 is dimensioned so that the clear lanes 56, 76 are not enclosed by the insulating band 68, and instead protrude from, and are exposed at, opposed open ends of the insulating band 68. The insulating band 68 maintains the electrode stack 64 in a compressed state in a direction parallel to the stack axis 66, and facilitates insertion of the electrode stack 64 into the cell housing 22 during cell assembly, as discussed further below.

Figure 19:
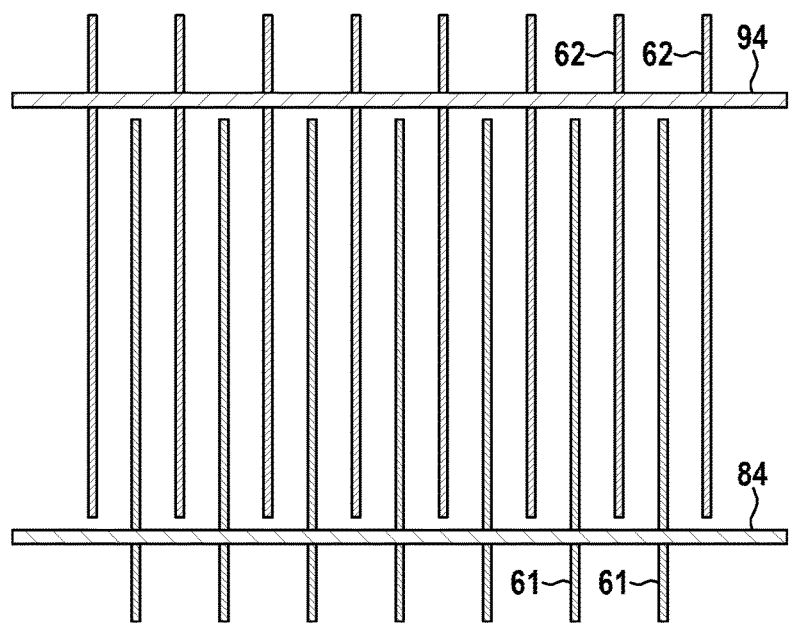
FIG. 19 is a schematic cross-sectional view of a portion of the electrode stack illustrating the method step of inserting the first and second inner plates into the openings of the electrode plates prior to folding the clear lanes. The separator is omitted and only a subset of electrode plates are illustrated for clarity.

Prior to folding the respective clear lanes 56, 76, the electrically conductive first inner plate 81 is inserted through the opening 58 in the clear lane 56 of each of the positive electrode plates 61 (step 606), and the electrically conductive second inner plate 91 is inserted through the opening 78 in the clear lane 76 of each of the negative electrode plates 62 (step 607) (FIG. 19). In some embodiments, an insulating layer may be applied to the inward-facing surface of each of the first inner plate 81 and the second inner plate 91, for example by using an adhesive insulating tape. Upon insertion through the respective openings 58, 78, the first inner plate 81 and the second inner plate 91 are disposed on opposed sides of the electrode stack 64, and each extend in a direction perpendicular to the positive and negative electrode plates 61, 62. In some manufacturing processes, alternative method steps may be substituted for steps 605 and 606 that include providing the first and second inner plates 81, 91 in a spaced, parallel relationship, and stacking the electrode plates 61, 62 in an alternating manner by mounting the positive plates on the first inner plate via the openings 58, and mounting the negative electrode plates 62 on the second inner plate 91 via the openings 78. The alternative method steps include arranging the separator 63 between adjacent electrode plates 61, 62 in a Z-folded configuration. This approach facilitates precise alignment of the electrode plates 61, 62.

After first inner plate 81 is disposed in the respective openings 58 of each positive electrode plate 61, the clear lane 56 of each positive electrode plate 61 is folded along a first fold line 59 that extends along a margin of the opening 58, in such a way that the clear lane 56 overlies one side of the electrode stack 64 and the first inner plate 81 (step 608). Similarly, after second inner plate 91 is disposed in the respective openings 78 of each negative electrode plate 62, the clear lane 76 of each negative electrode plate 62 is folded along a second fold 79 line that extends along a margin of the opening 78, in such a way that the clear lane 76 overlies an opposed side of the electrode stack 64 and the second inner plate 91 (step 609) (FIG. 11).

The electrically conductive first outer plate 84 is then disposed over the folded positive clear lanes 56 such that the first outer plate 84 overlies the first inner plate 81 and the positive clear lanes 56 are disposed between the first outer plate 84 and the first inner plate 81 (step 610). Likewise, the electrically conductive second outer plate 94 is then disposed over the folded negative clear lanes 76 such that the second outer plate 94 overlies the second inner plate 91 and the second clear lanes 76 are disposed between the second outer plate 94 and the second inner plate 91 (step 611) (FIG. 12).

Subsequent to placement of the first outer plate 84 over the folded positive clear lanes 56, the first inner plate 81, the folded positive clear lanes 56, and the first outer plate 84 are electrically connected together, for example via welding or other appropriate technique, whereby an electrical connection is formed between the first inner plate 81, the folded positive clear lanes 56, and the first outer plate 84 (step 612). In addition, subsequent to placement of the second outer plate 94 over the folded negative clear lanes 76, the second inner plate 91, the folded negative clear lanes 76, and the second outer plate 94 are electrically connected together, for example via welding or other appropriate technique, to form an electrical connection between the second inner plate 91, the folded negative clear lanes 76, and the second outer plate 94 (step 613). As a result of these connecting steps 611, 612, the electrode assembly 60 partially assembled. The electrode assembly is inserted into the sidewall 25 in this partially assembled state (e.g., prior to becoming fully assembled), as discussed below.

Prior to insertion of the partially assembled electrode assembly into the sidewall 25, the insert 40 is placed on one end of the partially assembled electrode assembly (step 614). In particular, the insert 40 is arranged so that the wall portions 41, 42, 43, 44 surround the second inner plate 91, the folded negative clear lanes 76, and the second outer plate 94, as well as adjacent portions of the electrode stack 64. By this configuration, the insert 40 protects the partially assembled electrode stack as it is inserted into the sidewall 25.

The partially assembled electrode assembly and the insert 40 are inserted as a unit into the cell housing sidewall 25 (step 615). During insertion of the partially assembled electrode assembly into the sidewall 25, the electrode stack 64 is oriented so that when it is disposed within the cell housing 22, the stack axis 66 extends in a direction that is normal to, and passes through, each side 28, 29 of the pair of minor sides. In addition, the electrode stack 64 is oriented so that the insert 40 provides the leading end during insertion, whereby the insert 40 protects the electrode stack during insertion into the sidewall 25. The partially assembled electrode assembly and the insert 40 are inserted through the sidewall 25 until the end of the insert 40 is aligned with the end of the sidewall 25 (FIG. 17).

Figure 20:
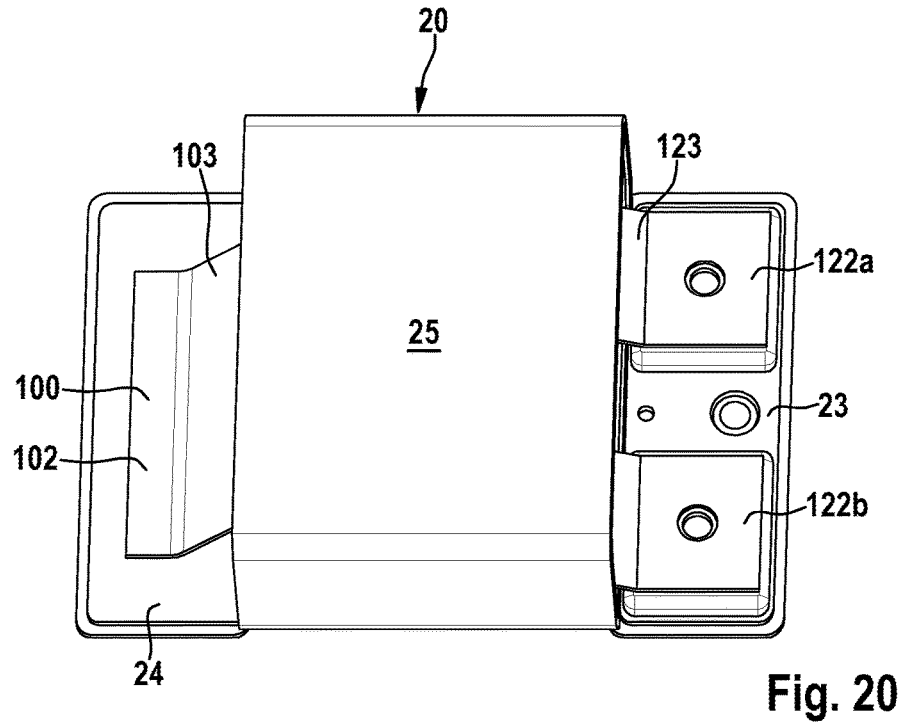
FIG. 20 is a perspective view of the cell during manufacture thereof, illustrating the cell housing configuration prior to folding of the first and second connectors.

With the partially assembled electrode assembly and the insert 40 disposed within the sidewall 25, the first leg 101 of the first connector 100 is electrically connected, for example via welding, to the first outer plate 84. In addition, the second leg 102 of the first connector 100 is electrically connected, for example via welding, to the cell housing second end 24 (step 616). Similarly, the first leg 121 of the second connector 120 is electrically connected, for example via welding, to the second outer plate 94. In addition, the second leg 122 of the second connector 120 is electrically connected, for example via welding, to the terminals 140, 142 (step 617). In particular, the first tab 122a of the second leg 122 is electrically connected to the first terminal 140, and the second tab 122b of the second leg 122 is electrically connected to the second terminal 142. As seen in FIG. 20, during steps 616 and 617, the cell housing first and second ends 23, 24 are not yet connected to the cell housing sidewall 25, and the first and second connectors 100, 120 have a splayed configuration. This arrangement facilitates access to welding locations on the first and second connectors 100, 120, whereby the welding process is made easy and weld reliability is improved.

Once the electrical connections have be established between the first current collector assembly 80 and the cell housing second end 24 and between the second current collector assembly 90 and the terminals 140, 142, the cell housing 22 is assembled. In particular, the first connector 100 is folded such that the first leg 101 overlies the second leg 102 (618). As a result of the folding step 618, the cell housing second end 24 abuts, and closes, one open end of the cell housing sidewall 25. The second connector 120 is folded such that the first leg 121 overlies the second leg 122 (step 619). As a result of folding step 619, the cell housing first end 23 abuts the opposed end, and closes the opposed end, of the cell housing sidewall 25.

Following folding of the first connector 100, the cell housing second end 24 is fixed, for example by welding, to the one end of the cell housing sidewall 25 (Step 620). In addition, following folding of the second connector 120, the cell housing first end 23 is welded to the opposed end of the cell housing sidewall 25 (Step 621). In the welding steps 620, 621, a weld line is formed around the circumference of each end of the cell housing sidewall to secure the respective first and second ends 23, 24 to the sidewall 25 and to fully assemble the cell housing 22. As a result of the welding steps 620, 621, a closed interior space is formed within the cell housing 22, and the electrode assembly 60 is disposed within the interior space.

In next steps, the cell housing 22 is filled with electrolyte via the electrolyte inlet port 39 and sealed (step 622) to provide the cell 20, and formation of the cell 20 is then performed using conventional techniques (step 623).

Figure 21:
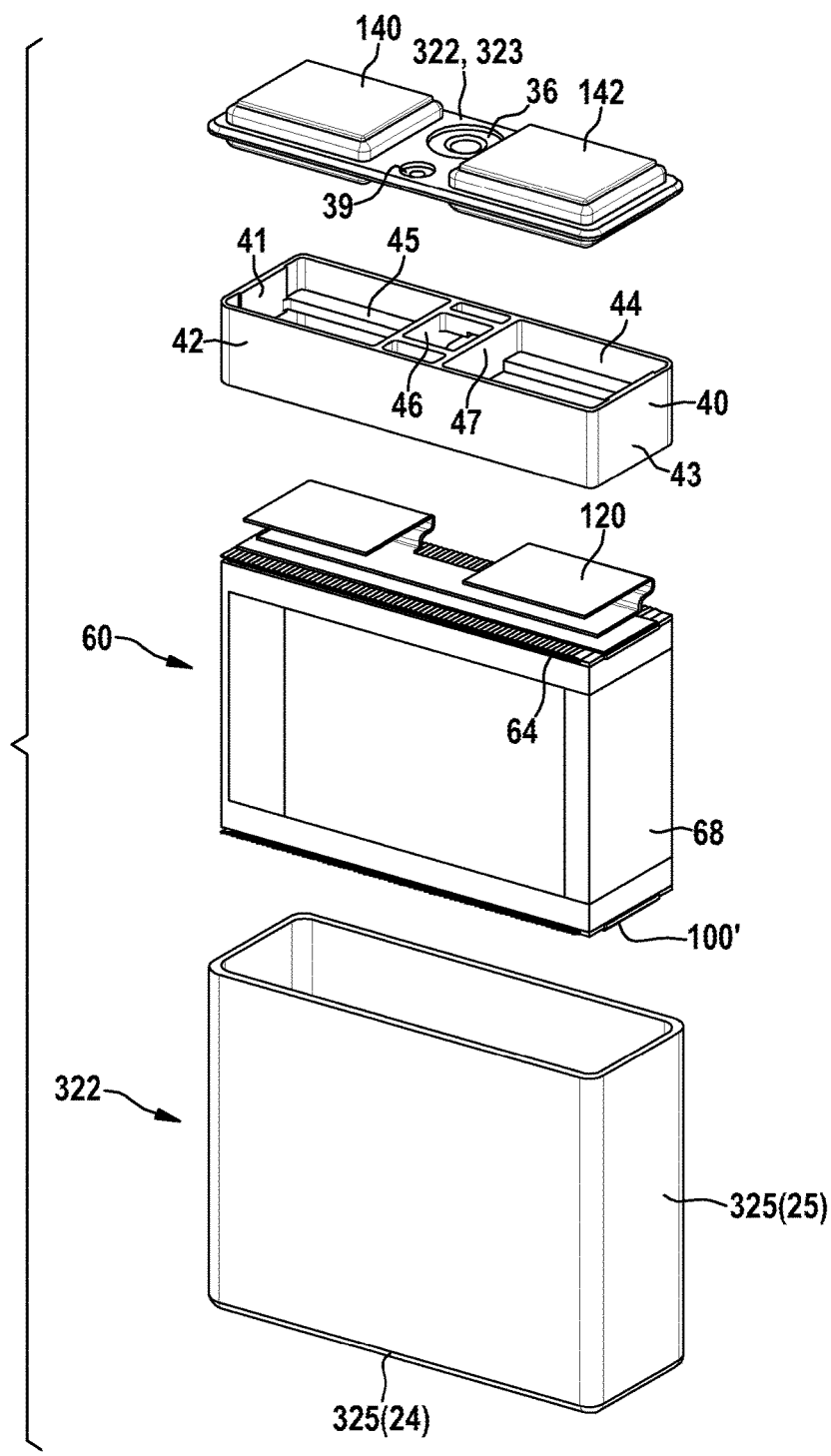
FIG. 21 is an exploded perspective view of a cell including an alternative embodiment cell housing.

In the illustrated embodiment, the cell housing 22 is formed of three separate elements, e the first end 23, the tubular sidewall 25 and the second end 24, which are joined together during manufacture to form a sealed container. However, the cell housing 22 is not limited to this configuration. For example, referring to FIG. 21, the cell 20 includes an alternative embodiment cell housing 322 that is formed of two separate elements, e.g., the first end 323 and a five-sided container 325 which are joined together during manufacture to form a sealed container. In the cell housing 322, the container 325 includes a tubular sidewall 325(25) that is formed integrally with the second end 325(24). Such a container 325 can be conveniently formed, for example in a drawing process. However, it may become challenging to form the welded electrical connections between the electrode stack 64 and the second current collector 90, and between the second current collector 90 and the inner surface of the cell housing second end 325(24).

This challenge may be addressed by employing an alternative first connector 100'. The alternative first connector 100' has a modified shape relative to the first connector 100 illustrated in FIG. 9. For example, the alternative first connector 100' is U-shaped and the base/fold edge is adjacent to, and parallel to, a minor side 29 of the cell housing 22. As a result, the alternative first connector 100' has elongated first and second legs 101', 102' of sufficient length to permit welding of the first leg to the first outer plate 84 and welding of the second leg to the inner surface of the integral second end 325(24), where these welding steps occur prior to insertion of the electrode stack 64 into the tubular sidewall 325(25).

The challenges associated with using a 5-sided container may alternatively be addressed by modifying of the first connector 100 in shape and/or material so that it serves as a spring element that provides, an electrical connection between the first outer plate 84 and the cell housing second end 325(24). The first connector 100 may be disposed in the cell housing 325 in the above-described position between the first outer plate 84 and the cell housing second end 325(24), but is not welded to these elements. Instead, the first connector forms a weld-free, direct and pressured electrical contact with the cell housing second end 325(24) and first outer plate 84.

In yet another alternative, the challenges associated with using a 5-sided container may be addressed by providing a direct, weld-free electrical connection between the electrode stack 64 and the cell housing second end 325(24). For example, the first connector 100 of the first current collector assembly 80 may be omitted, and the first outer plate 84 directly contacts the cell housing second end 325(24), thereby forming an electrical connection with the cell housing second end 325(24). As a result, the cell housing 322 has a positive polarity and serves as the positive terminal of the cell 20. In addition, the insert 40 may be dimensioned to apply a force to the electrode stack 64 that urges the electrode stack 64 toward the cell housing second end 24. This configuration also provides a weld-free electrical connection between the first current collector assembly 80 and the cell housing second end 325(24), where the electrical connection is made via direct physical contact. During manufacture of an alternative embodiment cell in which the first connector 100 is omitted, the method of manufacture will be modified in that method steps 616, 618 and 620 may be omitted.

In the illustrated embodiment the cell housing 22 is formed of aluminum so as to permit connection with the positive electrode plates 61 via the first current collector assembly 80, which are also formed of aluminum. However, in some embodiments, the cell housing 22 may be formed of other materials, for example, nickel-plated steel. By forming the cell housing 22 of nickel-plated steel, it becomes possible to connect either the positive electrode plates 61 or the negative electrode plates 62 to the cell housing, and the other to the terminals 140, 142. Alternatively, it becomes possible to connect the positive electrode plates 61 to one of the terminals (for example, the first terminal 140) and the negative electrode plates 62 to the other of the terminals (for example, the second terminal 142).

In the illustrated embodiment, the first current collector assembly 80, which is electrically connected to the positive electrode plates 61, is electrically connected to the cell housing second end 24, whereby the cell housing 22 has a positive polarity. However, it is understood that the first current collector assembly 80 may alternatively be electrically connected to the negative electrode plates 62, for example by rotating the electrode stack 64 within the cell housing by 180 degrees about the stack axis 66, whereby the cell housing 22 would have a negative polarity. In such an alternative embodiment, the second current collector assembly 90 would be electrically connected to the positive electrode plates 61, and provide an electrical connection to the terminals 140, 142.

Figure 22:
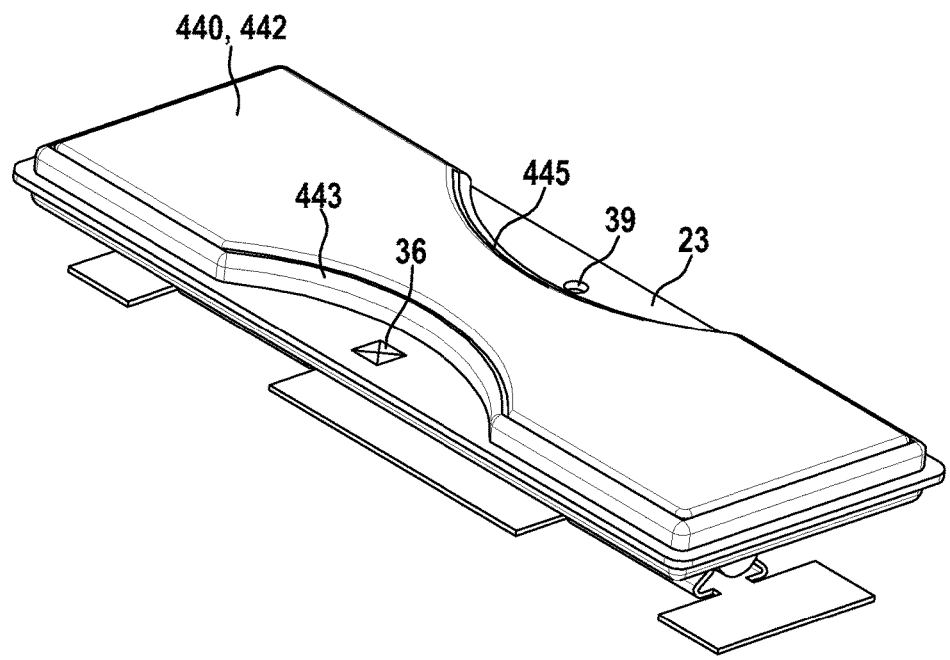
FIG. 22 is a perspective view of the cell housing first end illustrating an alternative embodiment terminal configuration.

In the illustrated embodiments, the cell housing 22 includes two individual terminals 140, 142 that are supported on the cell housing first end 23. It is understood that the cell housing is not limited to having two individual terminals 140, 142. For example, in some embodiments, the cell housing 22 may instead include a single terminal 440 (FIG. 22). Advantageously, use of a single terminal 440 provides an electrically conductive contact portion 442 that is at least 75 percent of the area of the cell housing first end 23, and includes cut outs 443, 445 to permit access to the vent and electrolyte inlet. In other embodiments, the cell housing 22 may include more than two terminals (not shown).

Figure 23:
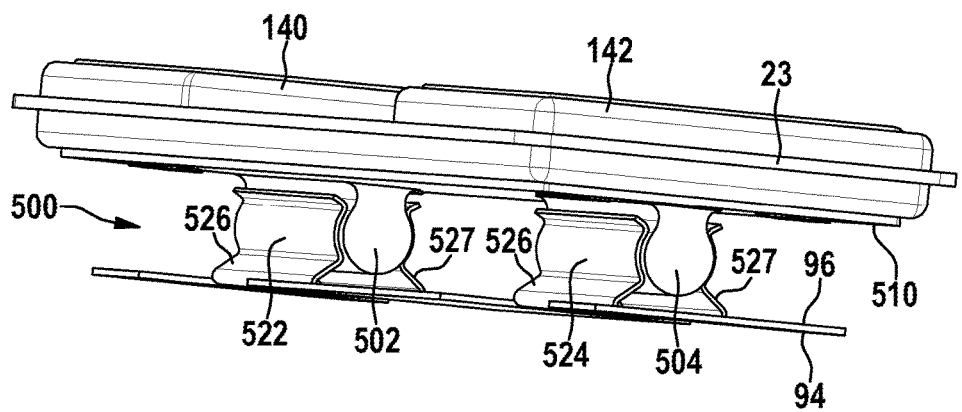
FIG. 23 is a perspective view of an alternative embodiment electrical connection between the terminals and the current collector assembly.

In the illustrated embodiment, the second current collector assembly 90 is electrically connected to the terminals 140, 142 via the second connector 120, which is welded to both the terminals 140, 142 and the second outer plate 94. However, in some embodiments, the electrical connection between the terminals 140, 142 and the second current collector assembly may be a weld-free connection. For example, referring to FIG. 23, in some embodiments the second connector 120 may be replaced by an electrically conductive snap-fit connection assembly 500. The connection assembly 500 includes an electrically conductive connector plate 510 that abuts the internal contact portion 170 of each terminal 140, 140. The connector plate 510 includes shaped posts 502, 504 that protrude toward the electrode stack 64. The connection assembly also includes electrically conductive spring clips 522, 524 that are fixed to the outward-facing surface 96 of the second outer plate 94. The spring clips 522, 524 are elastically deformable, and are shaped and dimensioned to receive and retain the shaped posts 502, 504 in a snap-fit manner. In the illustrated embodiment, the spring clips 522, 524 each include a pair of legs 526, 527 having a shape that is complimentary to the shape of the shaped posts 502, 504. In addition, the legs 526, 527 are spaced apart a distance that is less than a corresponding dimension of the shaped posts 502, 504. When the shaped posts 502, 504 are inserted into the spring clips 522, 524, the legs 526, 527 are deflected apart, and the elastic properties of the legs 526, 527 as well as the complimentary shape of the legs 526, 527 and shaped posts 502, 504, serve to retain the shaped posts 502, 504 within the spring clips 522, 524, whereby the electrical connection between the terminals 140, 142 and the second current collector assembly is achieved via a weld-free snap fit connection.

It is contemplated that, in addition to the exemplary cell embodiments described above, the cell 20 can be made to resemble a conventional cell, for example a cell having one positive terminal disposed on the cell first end 23, and one negative terminal disposed on the cell first end 23. This can be accomplished by only welding the negative terminal undersides to the copper current collector making that terminal negative and connecting the positive terminal to the cover plate itself making that terminal positive.

Although the electrode assembly 60 is described herein as including a series of stacked positive electrode plates 61 alternating with negative electrode plates 62 and separated by a z-folded separator 63, the electrode assembly is not limited to this configuration. For example, in some embodiments, the electrode plates 61 may be separated from the negative electrode plates 62 using individual separator plates.

Although the electrode assembly is described herein as being a "stacked" electrode assembly that includes a series of stacked plates, the electrode assembly is not limited to this configuration. For example, in some embodiments, the electrode assembly may include a rolled electrode assembly (e.g., a jelly roll assembly), a folded electrode assembly (i.e., a Z-fold assembly), or other electrode arrangement.

Although the cell housing 22 has an elongated rectangular shape in the exemplary embodiments, the cell housing 22 is not limited to this shape. For example, the cell housing may be cuboid in shape. In another example, the cell housing may have other polygonal shapes that permit close packing such as an eight surface structure having hexagonally arranged sides (not shown).

Moreover, the cells 20 are not limited to being a lithium-ion battery. For example, the cells may be aluminum-ion, alkaline, nickel-cadmium, nickel metal hydride, or other type of cell.

Selective illustrative embodiments of the battery pack including the cell are described above in some detail. It should be understood that only structures considered necessary for clarifying these devices have been described herein. Other conventional structures, and those of ancillary, and auxiliary components of the battery pack and of the cell, are assumed to be known and understood by those skilled in the art. Moreover, while working examples of the battery pack and the cell have been described above, the battery pack and/or the cell are not limited to the working examples described above, but various design alterations may be carried out without departing from the devices as set forth in the claims.

What is claimed is:

1. A method of manufacturing an electrochemical cell that comprises a rigid cell housing having the shape of a rectangular prism and an electrode assembly disposed in the cell housing, the method including the following steps:
   providing a cell housing first end;
   providing a cell housing second end;
   providing a cell housing sidewall in the form of a tube having a rectangular cross-sectional shape, the cell housing sidewall formed separately from each of the cell housing first end and the cell housing second end;
      providing the electrode assembly, which includes positive electrode plates alternating with negative electrode plates and separated by at least one separator to form an electrode stack, the positive electrode plates being joined so as to form a first common electrical connection and the negative electrode plates being joined so as to form a second common electrical connection;
      inserting the provided electrode assembly into the cell housing sidewall;
      following insertion of the electrode assembly into the cell housing sidewall, welding one portion of a first connector to the first common electrical connection and another portion of the first connector to the cell housing first end;
      following insertion of the electrode assembly into the cell housing sidewall, welding one portion of a second connector to the second common electrical connection and another portion of the second connector to the cell housing second end;
      following welding of the first connector to the first common electrical connection and the cell housing first end, welding the cell housing first end to one end of the cell housing sidewall; and
      following welding of the second connector to the second common electrical connection and to the cell housing second end, welding the cell housing second end to an end of the cell housing sidewall opposed to the one end of the cell housing sidewall.

2. The method of claim 1, wherein
   the electrode assembly defines a stack axis that extends parallel to a stacking direction of the positive electrode plates, the negative electrode plates and the at least one separator,
   the cell housing sidewall includes a pair of major sides joined by a pair of minor sides, where each side of the pair of major sides is larger in area than each side of the pair of minor sides, and
   the step of inserting the provided electrode assembly into the cell housing sidewall includes orienting the electrode stack within the cell housing such that the stack axis extends in a direction that is normal to, and passes through, each side of the pair of minor sides.

3. The method of claim 1, wherein
   the step of welding one portion of a second connector to the second common electrical connection and another portion of the second connector to the cell housing second end includes welding the another portion of the second connector to a terminal that protrudes through the cell housing second end;
   and
   folding the connector such that the one portion of the connector overlies the another portion of the connector, and such that the cell housing second end abuts the end of the cell housing sidewall opposed to the one end of the cell housing sidewall.

4. The method of claim 3, wherein the method steps of claim 3 are performed before the method step of welding the cell housing second end to the end of the cell housing sidewall opposed to the one end of the cell housing sidewall.

5. The method of claim 1, wherein
   each of the positive electrode plates comprise
      an electrically conductive first substrate;
      a first coating disposed on the first substrate, where the first coating is formed of a first active material;
      a first clear lane that is disposed along an edge of the positive electrode plate, the first clear lane being free of the first coating; and
      a first opening disposed within the first clear lane,
   each of the negative electrode plates comprise
      an electrically conductive second substrate;
      a second coating disposed on the second substrate, where the second coating is formed of a second active material;
      a second clear lane that is disposed along an edge of the negative electrode plate, the second clear lane being free of the second coating; and
      a second opening disposed within the second clear lane, and
   the method includes the following method steps:
   inserting an electrically conductive first inner plate through each first opening such that the first inner plate extends in a direction perpendicular to each positive electrode plate, and is electrically connected to at least one of the positive electrode plates; and
   inserting an electrically conductive second inner plate through each second opening such that the second inner plate extends in a direction perpendicular to each negative electrode plate, and is electrically connected to at least one of the negative electrode plates.

6. The method of claim 5, further comprising:
   folding each positive electrode plate along a first fold line that extends along a margin of the opening, whereby the first clear lane overlies a side of the electrode stack and the first inner plate; and folding each negative electrode along a second fold line that extends along a margin of the opening, whereby the second clear lane overlies a side of the electrode stack and the second inner plate.

7. The method of claim 6, further comprising:

disposing an electrically conductive first outer plate over folded first clear lanes such that the first outer plate overlies the first inner plate and the first clear lanes are disposed between the first outer plate and the first inner plate; and disposing an electrically conductive second outer plate over folded second clear lanes such that the second outer plate overlies the second inner plate and the second clear lanes are disposed between the second outer plate and the second inner plate.

8. The method of claim 7, further comprising:

welding the first inner plate, the folded first clear lanes, and the first outer plate together to form the first common electrical connection that electrically connects the first inner plate, the folded first clear lanes, and the first outer plate; and welding the second inner plate, the folded second clear lanes, and the second outer plate together to form the second common electrical connection that electrically connects the second inner plate, the folded second clear lanes, and the second outer plate.

9. The method of claim 8, wherein the step of welding one portion of a second connector to the second common electrical connection and another portion of the second connector to the cell housing second end comprises:

welding the first outer plate to the one portion of the second connector; and welding the another portion of the second connector to a terminal that protrudes through the cell housing second end.

10. The method of claim 9, wherein the first connector is used to electrically connect the first outer plate to the cell housing.

11. The method of claim 9, wherein the first connector is used to electrically connect the first outer plate to the cell housing via direct contact with the cell housing.

12. The method of claim 1, wherein each of the positive electrode plates and the negative electrode plates comprises:

an electrically conductive substrate;

a coating disposed on the substrate, where the coating is formed of an active material;

a clear lane that is disposed along an edge of the substrate, the clear lane being free of the coating; and an opening disposed within the clear lane, and the method includes the following method steps:

inserting an electrically conductive inner plate through each opening of at least one of the positive electrode plates and the negative electrode plates such that the inner plate extends in a direction perpendicular to each substrate, and is electrically connected to the substrate.

13. The method of claim 12, further comprising folding each electrode plate of the at least one of the positive electrode plates and the negative electrode plates along a first fold line that extends along a boundary between the coating and the clear lane, whereby the clear lane overlies a side of the electrode stack and the inner plate.

14. The method of claim 13, further comprising disposing an electrically conductive outer plate over the folded clear lanes such that the outer plate overlies the inner plate and the clear lanes are disposed between the outer plate and the inner plate.

15. The method of claim 14, further comprising welding the inner plate, the folded clear lanes, and the outer plate together to form an electrical connection between the inner plate, the folded clear lanes, and the outer plate.

16. The method of claim 15, further comprising electrically connecting the outer plate to one of a cell housing and a terminal that protrudes through the cell housing, where the terminal is electrically isolated from the cell housing.

17. The method of claim 16, wherein a connector is used to electrically connect the outer plate to the one of a cell housing and a terminal.

18. The method of claim 1, wherein the first end, the second end and the sidewall are provided as three individual and separate elements, the first connector electrically connects the positive electrode plates to a positive terminal, and the second connector electrically connects the negative electrode plates to a negative terminal.

19. The method of claim 1, wherein the second end and the sidewall are provided as a single integral entity, and the first end is provided as a separate element from the integral sidewall and second end, the electrode assembly includes a first current collector including the first connector that electrically connects one of the negative electrode plates and the positive electrode plates to first terminal, and the electrode assembly includes a second current collector that is connector free and forms a weld-free electrical connection between the other one of the the negative electrode plates and the positive electrode plates and a second terminal.

* * * * *